(12) United States Patent
Zander

(10) Patent No.: US 9,098,547 B1
(45) Date of Patent: Aug. 4, 2015

(54) GENERATION OF RESULTS TO A SEARCH QUERY WITH A TECHNICAL COMPUTING ENVIRONMENT (TCE)-BASED SEARCH ENGINE

(71) Applicant: The MathWorks, Inc., Natick, MA (US)

(72) Inventor: Justyna Zander, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 202 days.

(21) Appl. No.: 13/834,844

(22) Filed: Mar. 15, 2013

Related U.S. Application Data

(60) Provisional application No. 61/614,633, filed on Mar. 23, 2012.

(51) Int. Cl.
*G06F 17/30* (2006.01)

(52) U.S. Cl.
CPC ................................ *G06F 17/30424* (2013.01)

(58) Field of Classification Search
CPC .................................................. G06F 17/30424
See application file for complete search history.

(56) References Cited

U.S. PATENT DOCUMENTS

| | | | |
|---|---|---|---|
| 5,519,608 A | 5/1996 | Kupiec | |
| 7,693,813 B1 * | 4/2010 | Cao et al. | 707/999.001 |
| 2002/0143524 A1 * | 10/2002 | O'Neil et al. | 704/9 |
| 2004/0143570 A1 * | 7/2004 | Klock et al. | 707/3 |
| 2008/0049276 A1 * | 2/2008 | Abe | 358/524 |
| 2009/0259643 A1 * | 10/2009 | Peng et al. | 707/4 |
| 2012/0254827 A1 | 10/2012 | Conrad et al. | |

OTHER PUBLICATIONS

Wang et al., "Towards a collaborative modeling and simulation platform on the Internet", Advanced Engineering Informatics 24, 2010, pp. 208-218.
Soares et al., "A Modeling and Simulation Platform for Robot Kinematics aiming Visual Servo Control",http://www.intechopen.com, Apr. 2010, 21 pages.
Waddellm, P. et al., "The Open Platform for Urban Simulation and UrbanSim Version 4.3" User Guide and Reference Manual, The UrbanSim Project, University of California Berkeley, and University of Washington, Jan. 23, 2011, 313 pages.
Meng et al., "Combined Ray-Tracing and Radiosity Simulation for Urban Open Spaces", 19$^{th}$ International Congress on Acoustics Madrid, Sep. 2-7, 2007, 6 pages.
Living PlanIT, "Cities in the Cloud—A Living PlanIT Introduction to Future City Technologies", Sep. 10, 2011, 50 pages.
(Continued)

*Primary Examiner* — Syed Hasan
(74) *Attorney, Agent, or Firm* — Harrity & Harrity, LLP

(57) ABSTRACT

A device receives a search query, and transforms the search query into a transformed search query understood by a technical computing environment (TCE)-based search engine. The device determines information requested by the transformed search query, and selects one or more TCE models from a repository based on the information requested by the transformed search query. The device provides the information requested by the transformed search query to the selected one or more TCE models. The device executes the selected one or more TCE models, based on the information requested by the transformed search query, to generate an answer to the search query, and provides the answer for display.

20 Claims, 23 Drawing Sheets

(56) References Cited

OTHER PUBLICATIONS

Smith, "Simulation in the Cloud", Program Executive Office for Simulation, Training, & Instrumentation, May 18-20, 2013, 9 pages.
Scenario Navigator, "How does simulation in the cloud work?", http://scenarionavigator.systemsnavigator.com/?q=webversion_cloud, Dec. 10, 2009, 2 pages.
Medical Education Technologies, Inc., "Introducing METIVision: Simulation on Demand", 2010, 4 pages.
Perlewitz, "Computational Neuroscience—Software", http://home.earthlink.net/~perlewitz/sftwr.html, May 3, 2012, 13 pages.
Agarwal, "Secrets of Successful Internet Startups", May 5, 2011, 2 pages.
Deelip Menezes, "Autodesk Takes Simulation to the Cloud With Project Centaur", http://www.deelip.com/?p=2366, May 14, 2010, 7 pages.
Co-pending U.S. Appl. No. 13/834,671, entitled "Transforming a Search Query Into a Format Understood by a Technical Computing Environment (TCE)-Based Search Engine", by Zander, filed Mar. 15, 2013, 91 pages.
Co-pending U.S. Appl. No. 13/834,577, entitled "Creating a Technical Computing Environment (TCE)-Based Search Engine", by Zander, filed Mar. 15, 2013, 93 pages.

* cited by examiner

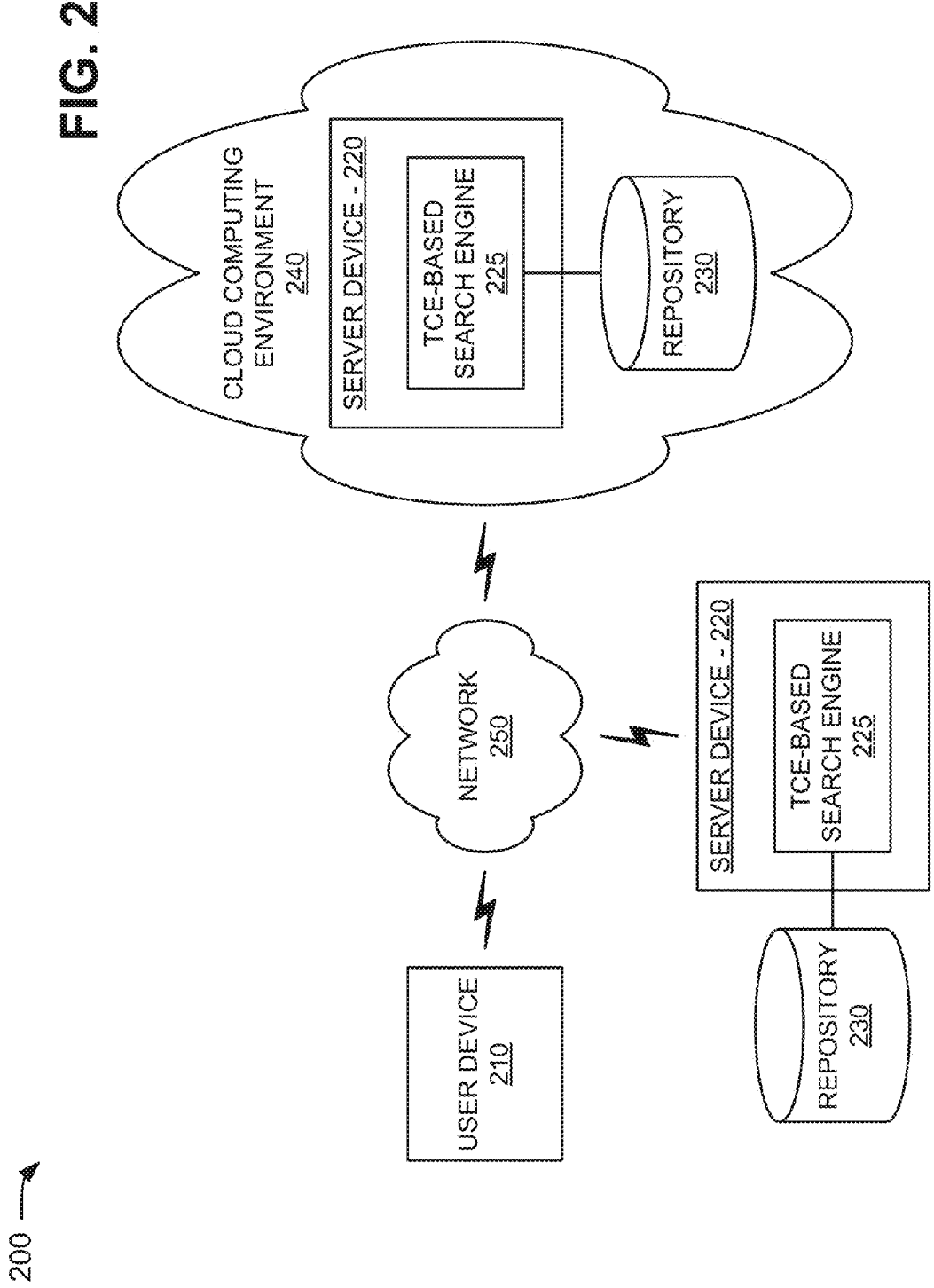

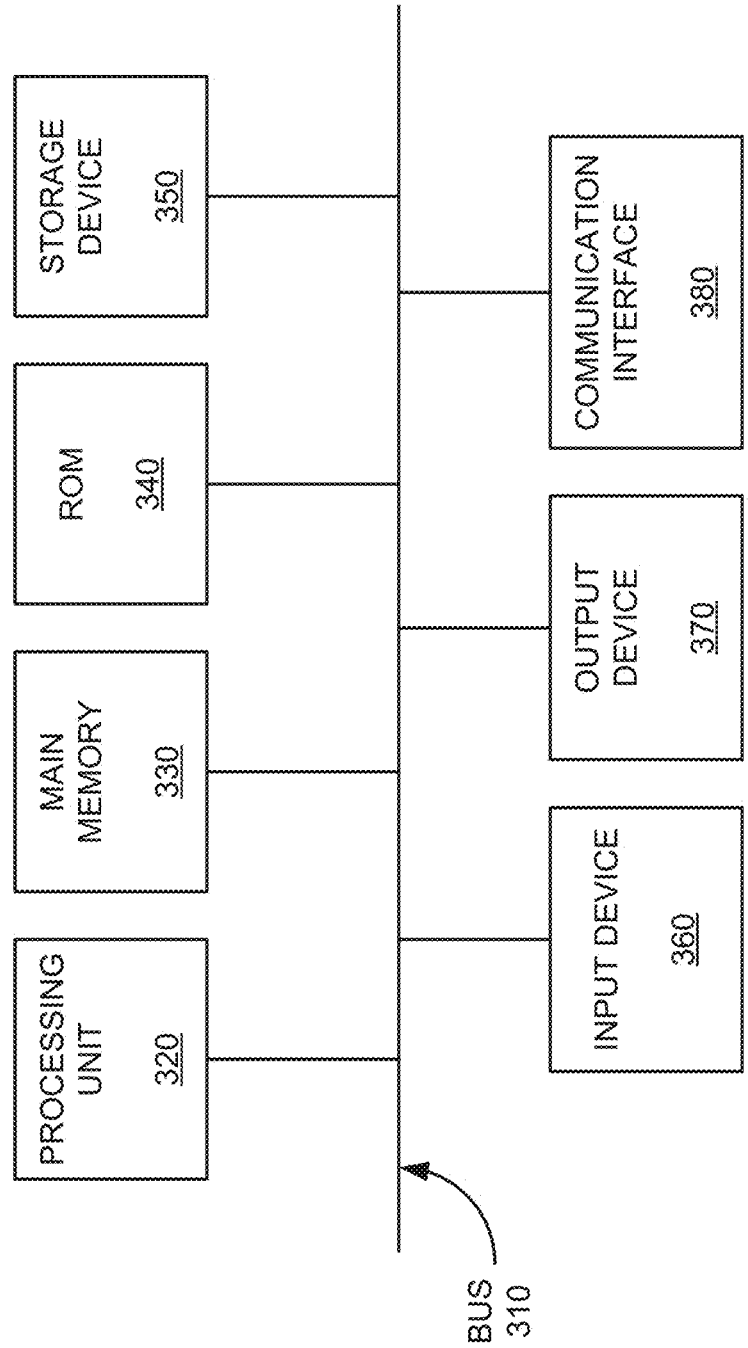

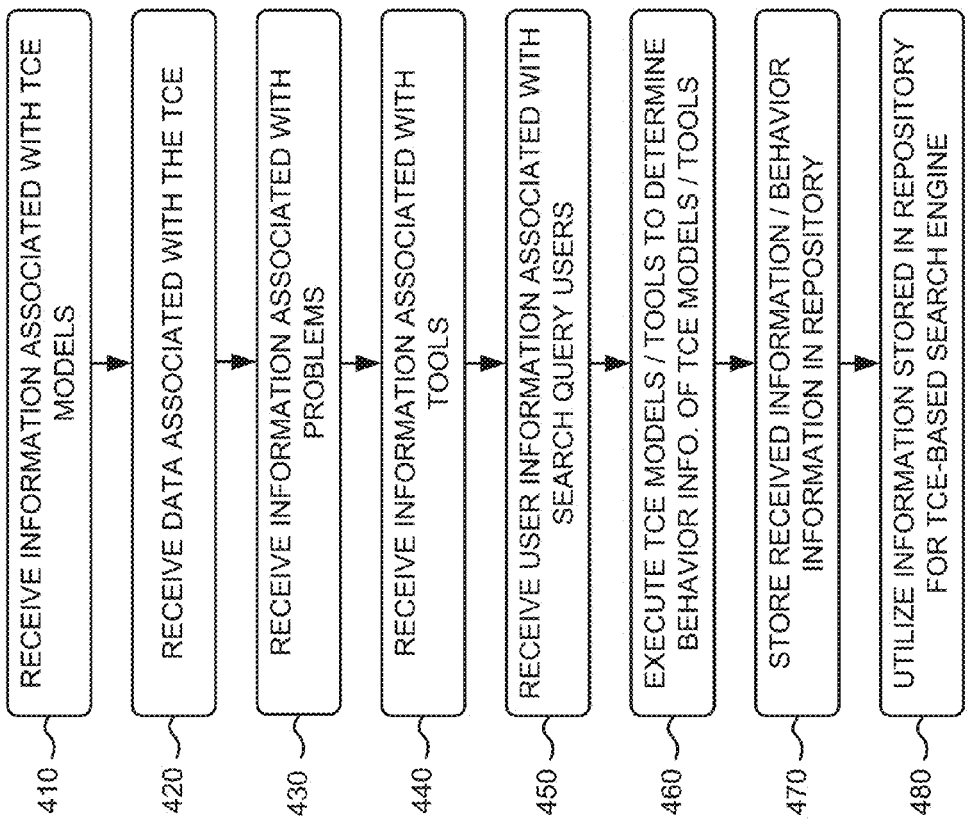

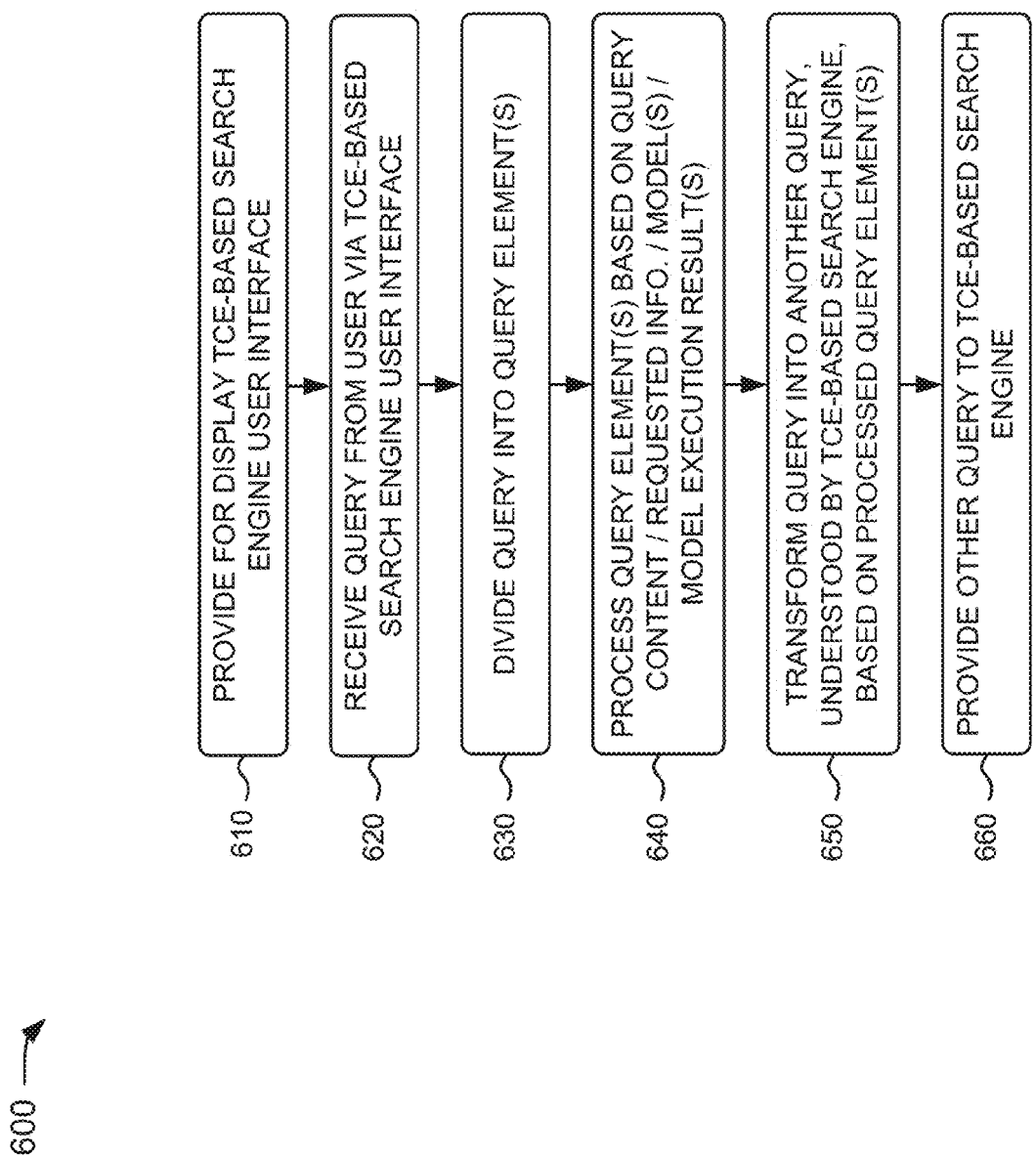

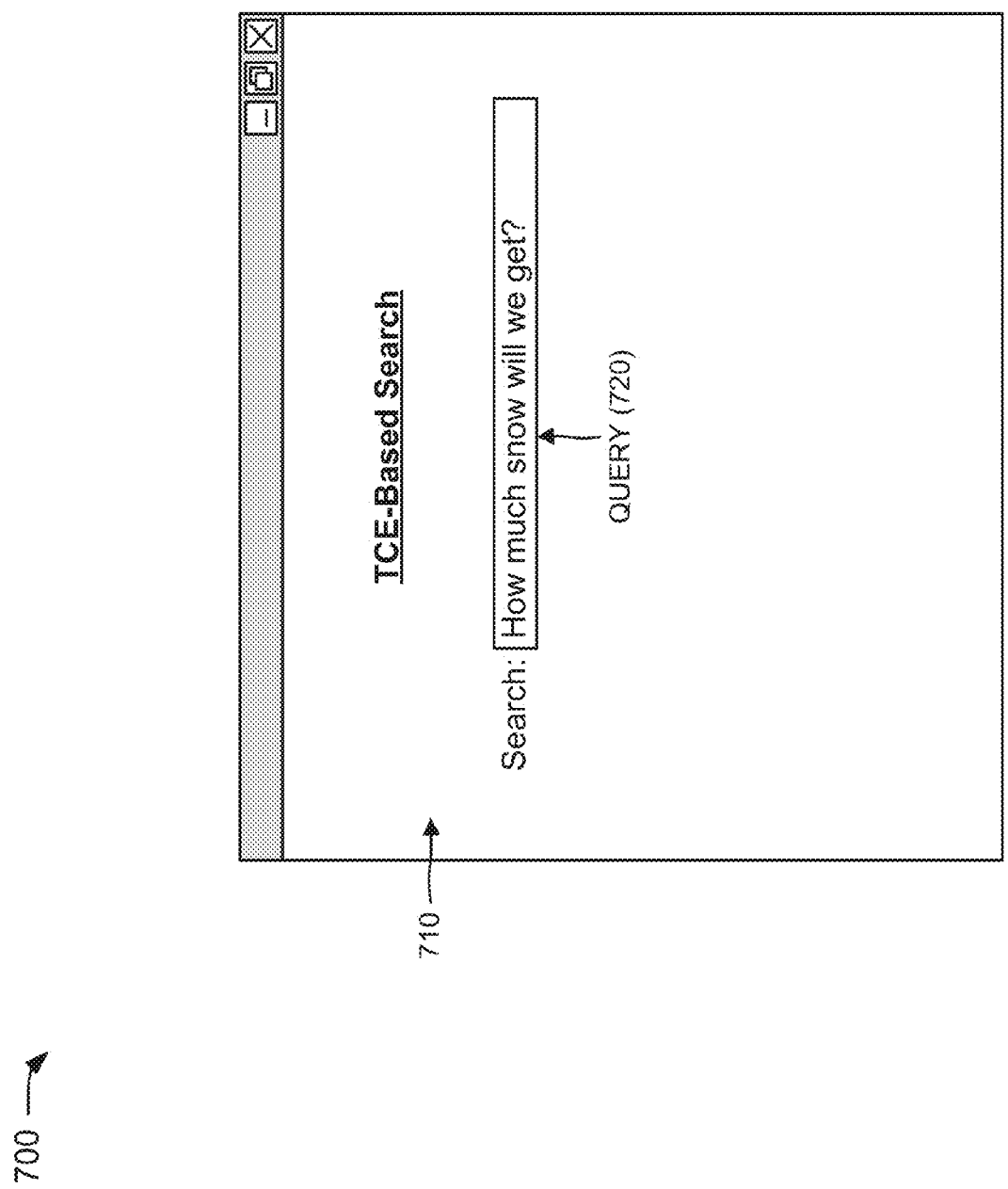

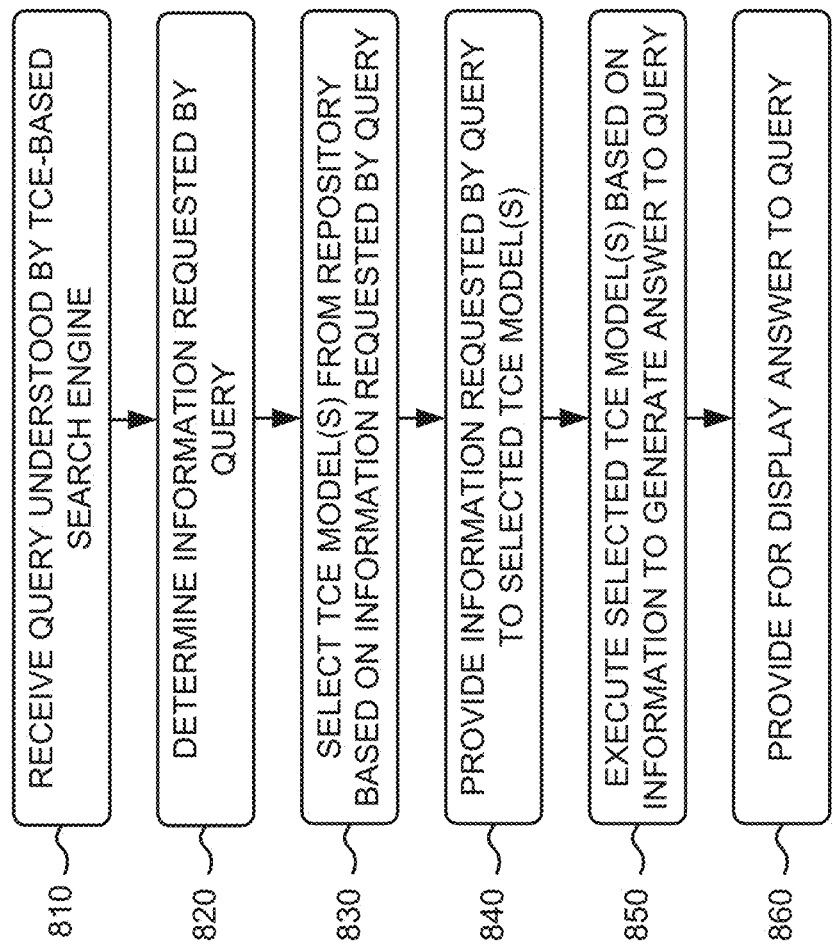

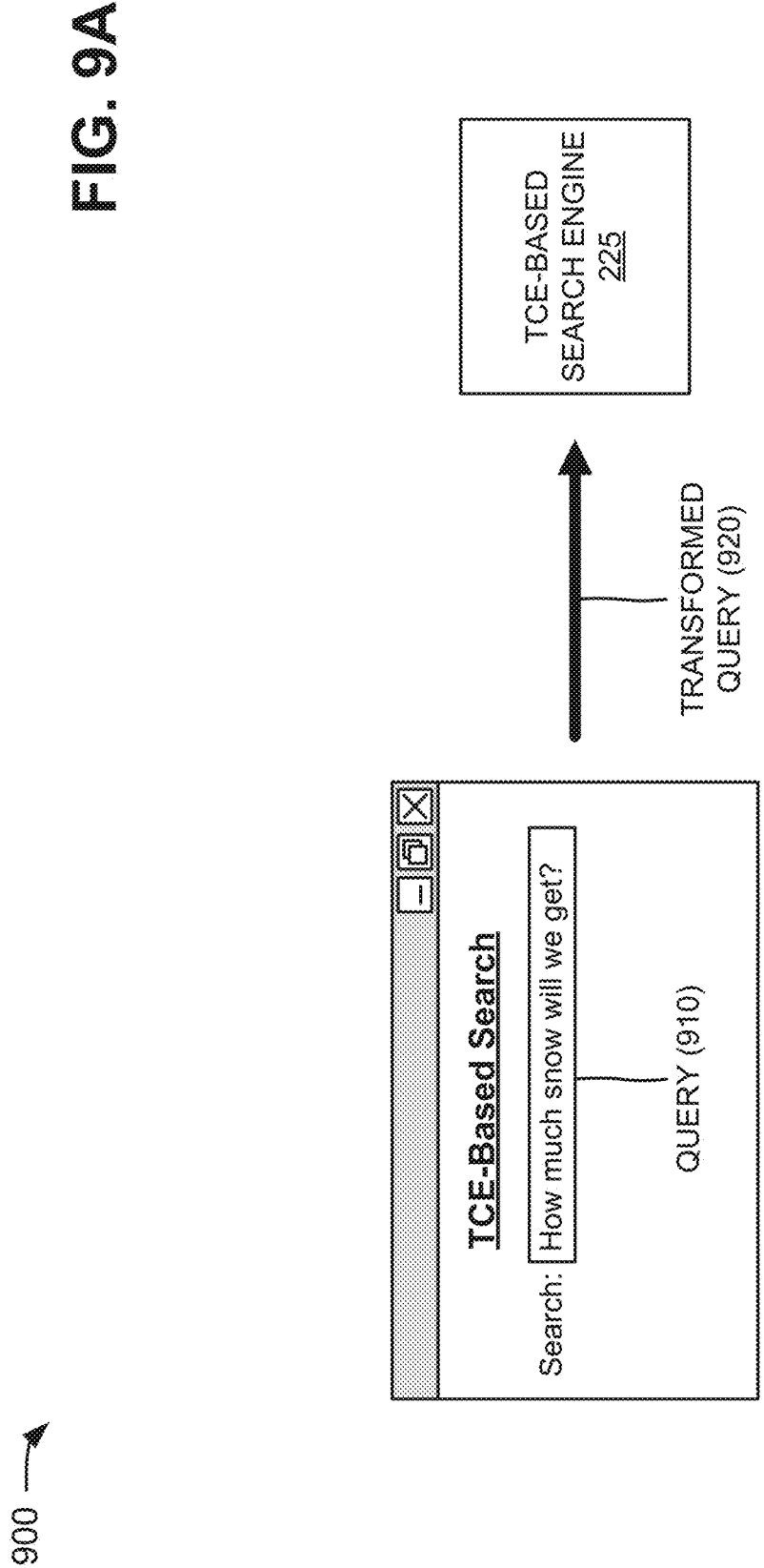

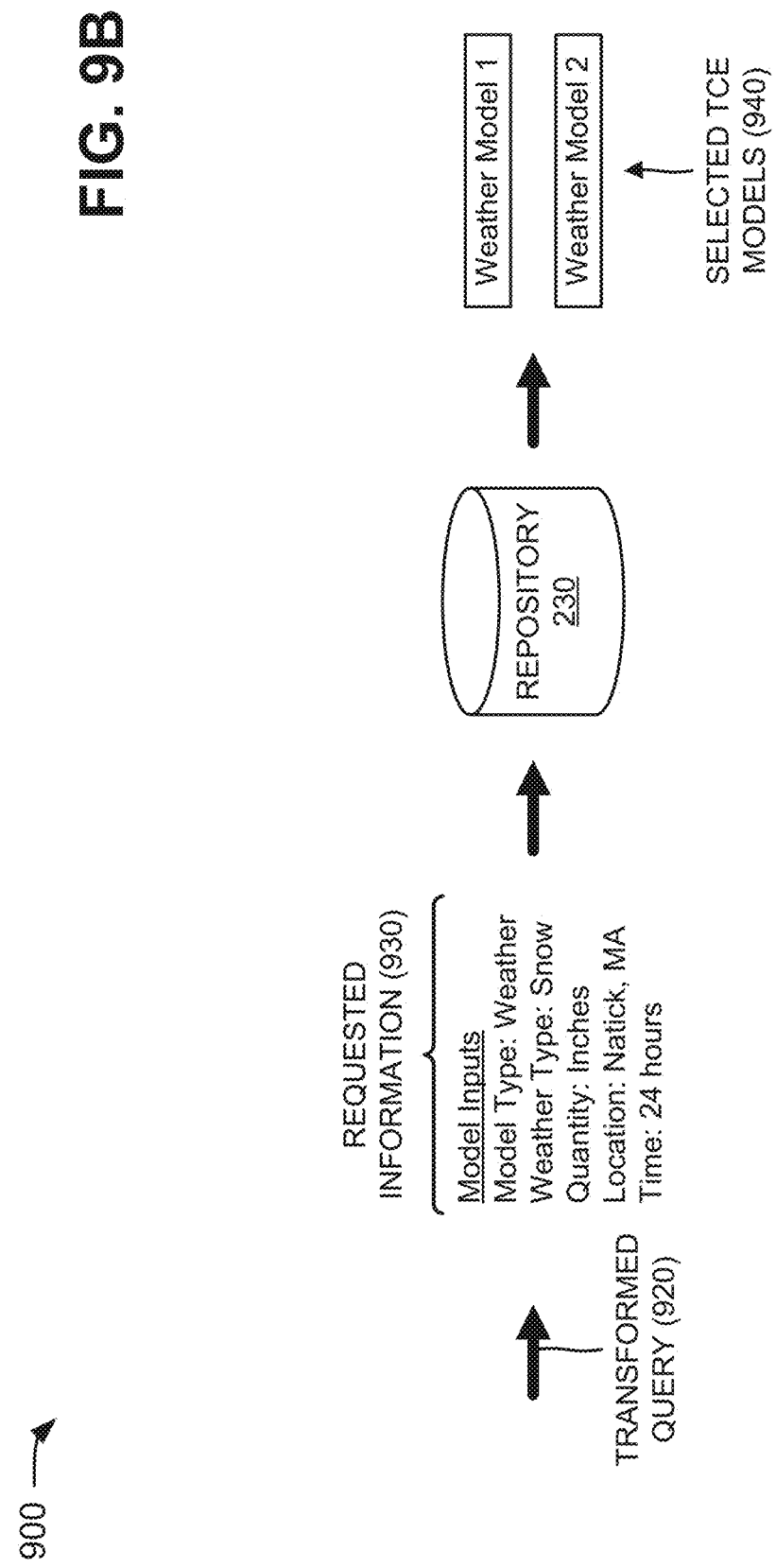

GENERATION OF RESULTS TO A SEARCH QUERY WITH A TECHNICAL COMPUTING ENVIRONMENT (TCE)-BASED SEARCH ENGINE

RELATED APPLICATION

This application claims priority under 35 U.S.C. §119 based on U.S. Provisional Patent Application No. 61/614,633, filed Mar. 23, 2012, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for creating a technical computing environment (TCE)-based search engine;

FIG. 6 is a flow chart of an example process for transforming a search query into a format understood by the TCE-based search engine;

FIGS. 7A-7D are diagrams of an example of the process described in connection with FIG. 6;

FIG. 8 is a flow chart of an example process for generating results to a search query with the TCE-based search engine; and FIGS. 9A-9D are diagrams of an example of the process described in connection with FIG. 8.

DETAILED DESCRIPTION

The following detailed description refers to the accompanying drawings. The same reference numbers in different drawings may identify the same or similar elements.

The World Wide Web ("web") contains a vast amount of information. Search engines assist users in locating desired portions of this information by cataloging or indexing web documents. Typically, in response to a user's request, a search engine returns links to documents relevant to the request.

Search engines may base their determination of the user's interest on search terms (called a search query) provided by the user. The goal of a search engine is to identify links to relevant search results based on the search query. Typically, the search engine accomplishes this by matching the terms in the search query to a corpus of pre-stored web documents. Web documents that contain the user's search terms are considered "hits" and are returned to the user.

The quality of the documents returned to the user depends on the quality of the ranking process used to rank the search results. For example, some ranking processes rank documents based on the number of links pointing to the documents, the ranks of the documents pointing to them, or the anchor text associated with the links pointing to them.

However, such search engines enable the user to receive links to documents relevant to a search query rather than an answer to the search query. For example, if the user inputs a search query for "what are the best guitars," the search engine will not provide an answer (e.g., a list of the best guitars) to the search query, but instead will return a list of links to documents that contain information about guitars. Furthermore, such search engines do not enable developers to add information to the search engines that may improve the performance of the search engines.

OVERVIEW

Systems and/or methods described herein may provide a technical computing environment (TCE)-based search engine that may provide an answer to a search query. The TCE-based search engine may be collaboratively created and improved by developers via a collaborative environment. The TCE-based search engine may provide an answer to a search query based on modeling, analysis, development, simulation, forecasting, and/or prediction of the search query in the TCE. The TCE-based search engine may be provided within a network (e.g., a social network, a professional network, etc.) that serves as an exchange for developers to share information and to provide information to the TCE-based search engine.

Figure 1:
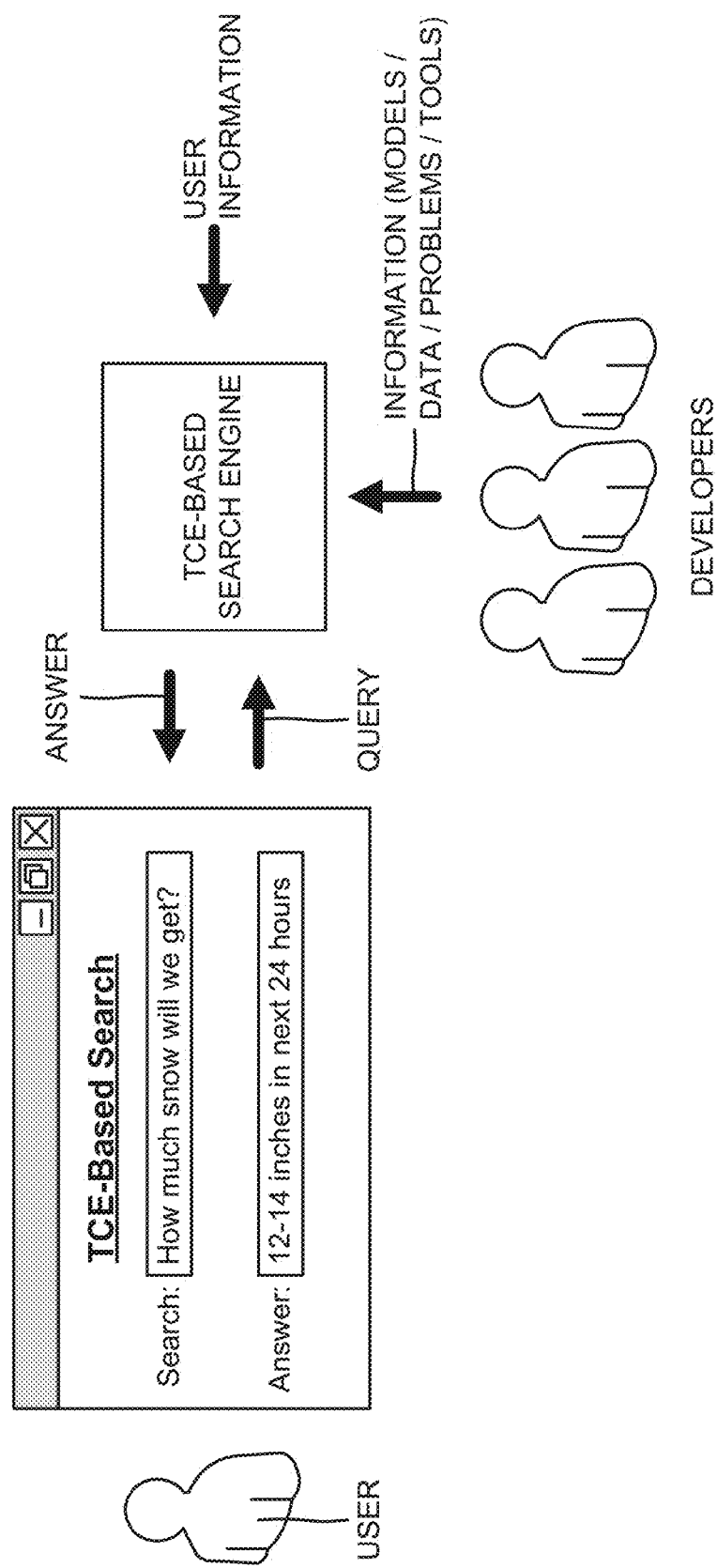
FIG. 1 is a diagram of an overview of an example implementation described herein.

FIG. 1 is a diagram of an overview of an example implementation described herein. For the overview, assume that a device includes TCE-based search engine. One or more developers (e.g., model developers, tool developers, engineers, scientists, etc.) may provide information to the TCE-based search engine of the device. For example, the developers may provide information associated with TCE models, data, problems, and/or tools to the TCE-based search engine. The TCE models may include any model capable of being provided to a TCE, as described herein. The data may include information available from the Internet that may be analyzed in a TCE. The problems may include information that defines problems, such as, for example, questions, issues, subjects, topics, etc. The tools may include any tool capable of being provided to a TCE, as described herein. As further shown in FIG. 1, the TCE-based search engine may receive user information associated with search query users. The user information may include user profiles, user locations, etc.

In some implementations, the device may execute the TCE models and/or the tools to determine behavior information associated with the TCE models and/or the tools. The device may store the received information and/or the behavior information in a repository associated with the TCE-based search engine. The device may generate the TCE-based search based on the information stored in the repository.

As further shown in FIG. 1, the device may provide for display a TCE-based search engine user interface. The TCE-based search engine user interface may be displayed to a user, and the user may provide a search query to the device via the TCE-based search engine user interface. For example, assume that the user inputs "How much snow will we get?" as the search query. The device may receive the search query, and may divide the search query into one or more query elements (e.g., words, phrases, etc.). The device may process the query element(s) based on content, requested information, model(s), model execution result(s), etc. associated with the search query. The device may transform the search query into another query, understood by the TCE-based search engine, based on the processed query element(s), and may provide the other query to the TCE-based search engine.

In some implementations, the TCE-based search engine may receive the other query, and may determine information requested by the other query. The TCE-based search engine may select one or more TCE models from the repository based on the information requested by the other query, and may provide the information requested by the other query to the selected TCE model(s). The device may execute the selected TCE model(s), based on the information requested by the other query, to generate an answer to the other query, and thus, the search query. The device may provide the answer to the search query for display to the user. For example, as shown in FIG. 1, the device may provide for display "12-14 inches in next 24 hours" as the answer to the search query.

Such an arrangement may provide a TCE-based search engine that generates answers to search queries, rather than links to documents most relevant to the search queries. The TCE-based search engine may generate such answers based on information (e.g., models, data, problems, tools, etc.) provided to a TCE by developers. Unlike typical search engines, the TCE-based search engine may enable the developers to add and/or modify information that may improve the performance of the TCE-based search engine. For example, the developers may add and/or improve model design environments, models, tools, input data, parameters, etc. to achieve a more comprehensive analysis, a multidisciplinary analysis, and/or a solution to a search query.

A collaborative environment, as described herein, may include an environment where people (e.g., developers) and/or computer agents may add TCE model information, TCE tool information, TCE data, user information, agent information, problem information, etc. to a repository. In some implementations, the collaborative environment may receive the aforementioned information via a plurality of interfaces (e.g., user interfaces, application programming interfaces (APIs), etc.). The collaborative environment may include an environment where people can add models on their own accord and/or the models can be added by automatic agents (e.g., using automatically adjusted, detected, and discovered models). In some implementations, the collaborative environment may be constituted by the TCE-based search engine or the content to which the TCE-based search engine has access.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

A document, as the term is used herein, is to be broadly interpreted to include any machine-readable and machine-storable work product. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information (such as meta information, images, hyperlinks, etc.) and/or embedded instructions (such as Javascript, etc.). A document may also include a model, a set of models, an abstraction, an abstract representation, etc.

Example Environment Arrangement

FIG. 2 is a diagram of an example environment 200 in which systems and/or methods described herein may be implemented. As illustrated, environment 200 may include a user device 210 interconnected with a server device 220, a repository 230, and/or a cloud computing environment 240, via a network 250. Server device 220 may include a TCE-based search engine 225, and cloud computing environment 240 may include server device 220 (e.g., with TCE-based search engine 225) and repository 230. Components of environment 200 may interconnect via wired and/or wireless connections.

User device 210 may include one or more devices that are capable of communicating with server device 220 via network 250. For example, user device 220 may include a laptop computer, a personal computer, a tablet computer, a desktop computer, a workstation computer, a smart phone, a personal digital assistant (PDA), and/or other computation devices.

Server device 220 may include one or more server devices, or other types of computation and communication devices. Server device 220 may include a device that is capable of communicating with user device 210 (e.g., via network 250). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 225 and may perform some or all of the functionality described herein for user device 210.

TCE-based search engine 225 may include a search engine provided within a TCE. The TCE and TCE-based search engine 225 may be provided within a computer-readable medium of server device 220 and may be accessible by user device 210. TCE-based search engine 225 may enable developers to collaboratively perform engineering tasks, computational modeling, analysis, dynamic analysis, behavioral analysis, coding, code autogeneration, development, simulation, etc. with one or more model design environments that may include, for example, tools, logic, source code, search engines, etc.

The TCE may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, the TCE may include a dynamically-typed programming language (e.g., the M language, a MATLAB® language, a MATLAB-compatible language, a MATLAB-like language, etc.) that can be used to express problems and/or solutions in mathematical notations.

For example, the TCE may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

In some implementations, the TCE may include other technical means that allow for applying select programming languages and/or using existing application programming interfaces. These interfaces may link to other search engines.

The TCE may further provide mathematical functions and/or graphical tools (e.g., for creating plots, surfaces, images, volumetric representations, etc.). In some implementations, the TCE may provide these functions and/or tools using toolboxes (e.g., toolboxes for signal processing, image processing, data plotting, parallel processing, etc.). In some implementations, the TCE may provide these functions as block sets or in another way, such as via a library, etc.

The TCE may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

The TCE may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as the TCE. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

The TCE may provide mathematical routines and a high-level programming language suitable for non-professional programmers and may provide graphical tools that may be used for creating plots, surfaces, images, volumetric representations, or other representations. The TCE may provide these routines and/or tools using toolboxes (e.g., toolboxes for signal processing, image processing, data plotting, parallel processing, etc.). The TCE may also provide these routines in other ways, such as, for example, via a library, a local or remote database (e.g., a database operating in a computing cloud), remote procedure calls (RPCs), and/or an application programming interface (API). The TCE may be configured to improve runtime performance when performing computing operations. For example, the TCE may include a just-in-time (JIT) compiler.

The TCE may include a modeling system that may be used in the creation of a functional model and that may enable generation of executable code based on the model. For example, the TCE may include a graphical modeling tool or application that provides a user interface for a numerical computing environment. Additionally, or alternatively, the TCE may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. Additionally, or alternatively, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Repository 230 may include a single memory device or multiple (possibly distributed) memory devices. Repository 230 may store various types of information associated with models, data, problems, tools, etc. implemented by the TCE; information associated with search query users; information associated with simulations, such as dynamic system models, parameters, initial state, input values, etc.; information associated with static analysis methods (e.g., abstract interpretation, model checking, etc.); etc.

Cloud computing environment 240 may include an environment that delivers computing as a service, whereby shared resources, services, user objects, etc. may be provided to user device 210 as a utility over a network. Cloud computing environment 240 may provide computation, software, data access, and/or storage services that do not require end-user (e.g., user device 210) knowledge of a physical location and configuration of system(s) and/or device(s) that deliver the services. In some implementations, cloud computing environment 240 may include server device 220, TCE-based search engine 225, and repository 230. In some implementations, cloud computing environment 240 may be provided in lieu of the standalone server device 220/repository 230. In some implementations, the standalone server device 220/repository 230 may be provided in lieu of cloud computing environment 240.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Creating a TCE-Based Search Engine

FIG. 4 is a flow chart of an example process 400 for creating TCE-based search engine 225. In some implementations, process 400 may be performed by the standalone server device 220 and/or repository 230. In some implementations, process 400 may be performed by another device or a group of devices (e.g., server device 220/repository 230 of cloud computing environment 240) separate from or including the standalone server device 220/repository 230.

As shown in FIG. 4, process 400 may include receiving information associated with TCE models (block 410). For example, one or more developers may provide information associated with one or more TCE models to server device 220, and server device 220 may receive the TCE model(s) information. In some implementations, server device 220 may receive the TCE model(s) information from other sources, such as, for example, the Internet.

In some implementations, the TCE model(s) may include models created using the TCE; computational modeling, analysis, development, and/or simulation methods, techniques, methodologies, technologies, logic, search engines, etc.; TCE models associated with, for example, embedded systems, cyber-physical systems, control systems, digital signal processing (DSP) systems, communications systems, image and video processing systems, FPGA design systems, test and measurement systems, geographic information systems, signal processing systems, etc.; TCE models associated with aerospace and defense, automotive, health and medicine, biotechnology and pharmaceutical, communications and telecommunication, electronics and semiconductors, robotics, energy production, financial services, industrial automation and machinery, chemistry, quantum computing, biology, architecture, computational music, biomechanics, human-computer interactions, material science, environmental and geoscience, nanotechnology, space and astronomy, social and human computation, entertainment, music, weather, etc.; etc. In some implementations, the information associated with the TCE model(s) may be combined together and/or integrated with other information, such as data, problems, tools, etc.

As further shown in FIG. 4, process 400 may include receiving data associated with the TCE (block 420). For example, one or more developers may provide data to server device 220, and server device 220 may receive the data. In some implementations, server device 220 may use crawlers to identify data on the Internet. A crawler is a program that exploits the link-based structure of the Internet to browse the Internet in a methodical, automated manner. A crawler may start with addresses (e.g., URLs) of links to visit. For each address on the list, the crawler may visit the document associated with the address. The crawler may identify outgoing links within the visited document and add addresses associated with these links to the list of addresses.

In some implementations, the data may include documents from the Internet that may provide useful information to TCE-based search engine 225. For example, the data may include one or more web pages that provide results of execution of the TCE model(s), information relevant to the TCE model(s), results of execution of one or more TCE tools, information relevant to the TCE tool(s), etc. The data may also include TCE model(s), dynamic behavior of TCE model(s), architectural model(s), model design environment(s), etc.

As further shown in FIG. 4, process 400 may include receiving information associated with problems (block 430). For example, one or more developers may provide information associated with problems to server device 220, and server device 220 may receive the information. In some implementations, server device 220 may receive the problems information from other sources, such as, for example, the Internet. In some implementations, the problems may include problems, causes, verified causes, purposes, topics, challenges, subjects, questions, issues, areas of interest, etc. that developers may want to solve or partially solve using one or more of the TCE models. A verified cause may include a cause provided by an authorized developer, described below.

In some implementations, a new problem may be directly or indirectly related to an existing problem. For example, a first automotive problem may be related to adaptive cruise control (ACC) and a second automotive problem may be related to a model-based design method and/or problem. A third automotive problem may be directly related to an automotive engine and may be directly related to the first automotive problem and/or the second automotive problem. The third automotive problem may also be indirectly related to the model-based design method and/or the model-based design problem.

In some implementations, operating on a problem may be a collaborative effort between, for example, a selected set of developers (e.g., programmers, modelers, analysts, computational analysts, engineers, citizen scientists, students, etc.) using computational exploration and computational analysis mechanisms (e.g., simulation, prediction, assessment, modification, modeling, computational modeling, abstract analysis, etc.) that expedite collaborative and/or cooperative discovery of a solution to the problem.

Returning to FIG. 4, process 400 may include receiving information associated with tools (block 440). For example, one or more developers may provide information associated with one or more TCE tools to server device 220, and server device 220 may receive the information. In some implementations, server device 220 may receive the TCE tool(s) information from other sources, such as, for example, the Internet. In some implementations, the TCE tool(s) may include tools created using the TCE; simulation tools, technologies, techniques, methods, etc.; computational exploration, computational modeling, prediction, transformation, etc. tools; logic, notations, notions, source code, computational search engines, etc. In some implementations, the tools may enable a set of actions (e.g., reading, editing, modifying, deleting, exchanging, simulating, etc.) to be performed on the TCE model(s). In some implementations, preinstalled tools may exist in the TCE, and developers may apply external tools to the preinstalled tools of the TCE.

In some implementations, the tools may include Origin-Lab, Comola, Simula, Modelica, Simulink®, Stateflow®, state-machines-based tools, LabView, National Instruments tools, Wolfram tools, Autodesk tools, SCADE tools, TargetLink, ASCET, Mentor Graphics tools, Vector, dSpace, Polyspace, hardware-related tools (e.g., xPC Target), Dymola, Mathematica, Unified Modeling Language (UML) tools, SysML tools, Eclipse Foundation tools, ASCEND, Facsimile, Galatea, GarlicSim, NS2, Physics Abstraction Layer, SimPy, Tortuga, Ptolemy-related development tools, Adaptive Communication Environment (ACE) tools, Automated Model Compiler (AMC), CheckMate Design Space Exploration Tool (DESERT), Generic Modeling Environment (GME), Graph Rewrite And Transformation (GReAT) tool, PTOLEMY II SPP, Universal Data Model (UDM), Web-based Open Tool Integration Framework (WOTIF), CTE/ES, Embedded Validator, MEval, MTest, PROVE-tech, Reactis Tester, Reactis Validator, Safety Checker Blockset, Safety Test Builder, Simulink® Validation and Verification™, Simulink® Design Verifier™, System Test™, Auto-Focus, Time Partitioning Testing, T-VEC Tester for Simulink, JUMBL, MaTeLo, MATT, MiLEST, etc.

As further shown in FIG. 4, process 400 may include receiving information associated with search query users (block 450). For example, server device 220 may receive user information associated with search query users that provide search queries to TCE-based search engine 225. In some implementations, server device 220 may employ a system to retrieve the user information from existing resources that are provided by the search query users or permitted by the search query users to be retrieved. In some implementations, the user information may include personal information associated with the search query users (e.g., digital identities, social network information, address information, demographic information, etc.); profile information associated with the search query users; location information associated with the search query users (e.g., geographical location information, location information associated with user logins, etc.); etc.

In some implementations, the search query users may initiate and/or manipulate (e.g., enter, input, modify, delete, share, etc.) the user profile information; may maintain user manipulation activities; etc. In some implementations, the user information may relate users based on geographical proximity, may relate users based on skill sets possessed by the users, may relate users and/or other information received by server device 220 using a skill proximity analysis, etc. The skill proximity analysis may include a mechanism that compares different social, professional, and/or other skills, and prioritizes the skills so that users and/or the other information received by server device 220 may be related to each other and located and/or selected based on the skill proximity analysis.

Returning to FIG. 4, process 400 may include executing the TCE model(s) and the TCE tool(s) to determine behavior information associated with the TCE model(s) and the TCE tool(s) (block 460). For example, server device 220 may utilize the TCE to execute the TCE model(s) and/or the TCE tool(s). Execution of the TCE model(s) may generate behavior information associated with the TCE model(s). The behavior information may include, for example, outputs of the TCE model(s), accuracies of the TCE model(s), errors associated with the TCE model(s), efficiencies of the TCE model(s), execution times of the TCE model(s), etc. In some implementations, execution of the TCE tool(s) may generate behavior information associated with the TCE tool(s). The behavior information may include, for example, outputs of the TCE tool(s), accuracies of the TCE tool(s), errors associated with the TCE tool(s), efficiencies of the TCE tool(s), execution times of the TCE tool(s), etc.

As further shown in FIG. 4, process 400 may include storing the received information and the behavior information in a repository (block 470). For example, server device 220 may store the TCE model(s) information, the data, the problems information, the TCE tool(s) information, and/or the behavior information associated with the TCE model(s)/TCE tool(s) in repository 230. In some implementations, server device 220 may integrate, combine, etc. one or more portions of the information before storing the information in repository 230. In some implementations, server device 220 may store the TCE model(s) information, the data, the problems information, the TCE tool(s) information, and/or the behavior information in separate data structures (e.g., databases) of repository 230. In some implementations, the information stored in repository 230 may include one or more data storage formats. The data storage format may depend on the amount, size, and complexity of the information stored in repository 230.

Returning to FIG. 4, process 400 may include utilizing the information stored in the repository for a TCE-based search engine (block 480). For example, server device 220 may utilize the information stored in repository 230 for TCE-based search engine 225. In some implementations, TCE-based search engine 225 may compare information requested by a search query to the information stored in repository 230, and may select information from repository 230 based on the comparison. For example, TCE-based search engine 225 may select one or more TCE models from repository 230, and may use the selected TCE model(s) to generate an answer to the search query.

In some implementations, TCE-based search engine 225 may be utilized by developers and/or any type of users (e.g., including artificial-intelligence agents) for research and science collaboration, engineering collaboration, development collaboration, simulation collaboration, prediction collaboration, analysis and transformation collaboration, cause analysis, interpretation assessment, mass-scale collaboration, etc. Collaboration may include activities such as, for example, analyzing, simulating, predicting, assessing, modifying, modeling, abstracting, etc. a search query to predict or assess query issues and/or to make decisions based on the search query. Collaboration may include a developer participating in providing a solution within TCE-based search engine 225.

In some implementations, application of TCE-based search engine 225 may be utilized for online marketing, search query optimization, pay-per-click management solutions, simulation optimization, etc. TCE-based search engine 225 may provide a one-click solution, to search query users, that may reduce a number of steps required to receive an answer to a search query. TCE-based search engine 225 may limit a number of tools, plugins, and/or other computing functionality that has to be installed to enable users to use TCE-based search engine 225.

In some implementations, search query users and/or developers may access TCE-based search engine 225 using different schemes, such as, for example, anonymously, based on predefined subscription criteria (e.g., a free membership, a premium membership, a privileged membership, a per-use basis, a monthly subscription, a subscription based on performance, a subscription based on merit, a subscription based on reputation, a subscription based on affiliation, etc.), and/or based on other criteria (e.g., merit, reputation, etc.).

Further details of TCE-based search engine 225 are described below in connection with, for example, FIGS. 6-9D.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example of Creating a TCE-Based Search Engine

FIGS. 5A-5I are diagrams of an example 500 of the process described above with respect to FIG. 4. In example 500, assume that server device 220 may enable developers to create and modify TCE-based search engine 225 via a variety of user interfaces. Server device 220 may enable the developers to collaboratively and/or cooperatively explore problems and solutions by, for example, computational modeling, analysis, reasoning, development, simulation, etc. Server device 220 may enable the collaboration and/or cooperation via a social business network and/or a specific integrated multidisciplinary environment. In some implementations, the social business network may include computational analysis mechanisms such as, for example, dedicated and/or general purpose technologies; computational modeling, transformation, analysis, and simulation tools, logic, notations, source code, search engines, etc.; etc.

Figure 5A:
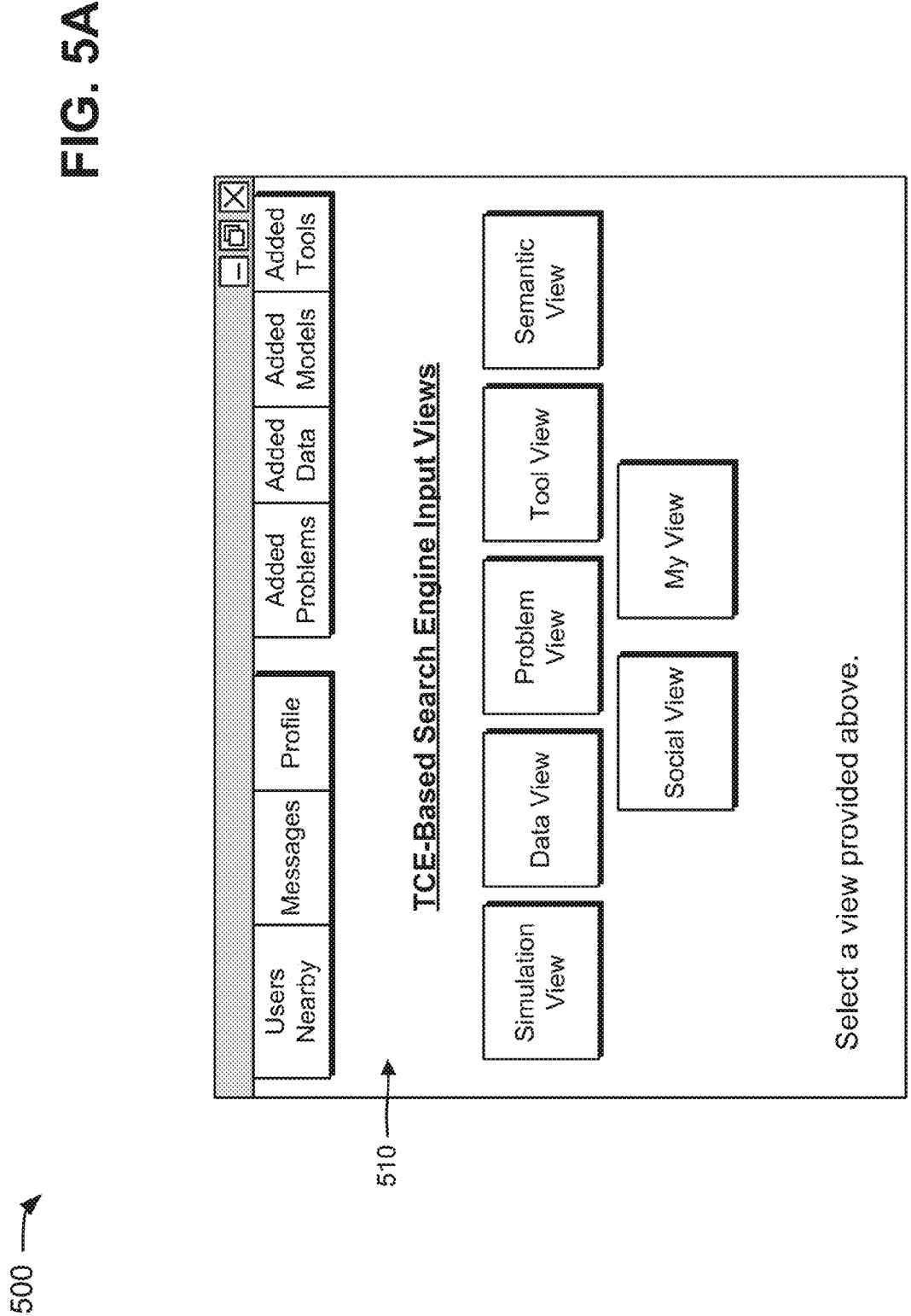
FIGS. 5A-5I are diagrams of an example of the process described in connection with FIG. 4.

As shown in FIG. 5A, server device 220 may provide a user interface 510 that enables developers to select a variety of views associated with providing information to TCE-based search engine 225 and/or repository 230. The views may include templates, forms, questions, indications, etc. that may assist developers in providing information to TCE-based search engine 225 and/or repository 230. In some implementations, different views may be switched off and on, switched between, and/or located next to one another by the developers. In some implementations, each view may be linked to other views, and mechanisms (e.g., buttons, links, icons, etc.) may enable the developers to navigate from one view to another view. In some implementations, a view may include some or all of the functionality provided in one or more other views.

As further shown in FIG. 5A, user interface 510 may include mechanisms (e.g., buttons, links, icons, etc.) associated with a simulation view, a data view, a problem view, a tool view, a semantic view, a social view, and/or a my view. The simulation view mechanism, when selected, may provide simulation views that enable developers to provide TCE model(s) information to TCE-based search engine 225 and/or repository 230. Further details of the simulation views are described below in connection with FIGS. 5B and 5C. The data view mechanism, when selected, may provide a data view that enables developers to provide data to TCE-based search engine 225 and/or repository 230. Further details of the data view are described below in connection with FIG. 5D. The problem view mechanism, when selected, may provide a problem view that enables developers to provide problem information to TCE-based search engine 225 and/or repository 230. Further details of the problem view are described below in connection with FIG. 5E.

The tool view mechanism, when selected, may provide a tool view that enables developers to provide tool information to TCE-based search engine 225 and/or repository 230. Further details of the tool view are described below in connection with FIG. 5F. The semantic view mechanism, when selected, may provide a semantic view that enables developers to create semantics of simulation execution. Further details of the semantic view are described below in connection with FIG. 5G. The social view mechanism, when selected, may provide a social view that enables developers to manage profiles associated with the developers. Further details of the social view are described below in connection with FIG. 5H. The my view mechanism, when selected, may provide a my view that enables developers to create new views for providing information to TCE-based search engine 225 and/or repository 230. Further details of the my view are described below in connection with FIG. 5I.

As further shown in FIG. 5A, user interface 510 may include a users nearby mechanism (e.g., a button, a link, an icon, etc.) that, when selected, may cause device 220 to provide for display a list of developers located geographically near (e.g., within a predetermined distance of) the developer viewing user interface 510. User interface 510 may include a messages mechanism (e.g., a button, a link, an icon, etc.) that, when selected, may cause device 220 to provide for display messages (e.g., email messages, instant messages, etc.) associated with the developer viewing user interface 510. User interface 510 may include a profile mechanism (e.g., a button, a link, an icon, etc.) that, when selected, may cause device 220 to provide for display a profile associated with the developer viewing user interface 510. User interface 510 may include an added problems mechanism (e.g., a button, a link, an icon, etc.) that, when selected, may cause device 220 to provide for display a list of problems added to TCE-based search engine 225 and/or repository 230 by the developer viewing user interface 510.

User interface 510 may include an added data mechanism (e.g., a button, a link, an icon, etc.) that, when selected, may cause device 220 to provide for display a list of data added to TCE-based search engine 225 and/or repository 230 by the developer viewing user interface 510. User interface 510 may include an added models mechanism (e.g., a button, a link, an icon, etc.) that, when selected, may cause device 220 to provide for display a list of models added to TCE-based search engine 225 and/or repository 230 by the developer viewing user interface 510. User interface 510 may include an added tools mechanism (e.g., a button, a link, an icon, etc.) that, when selected, may cause device 220 to provide for display a list of tools added to TCE-based search engine 225 and/or repository 230 by the developer viewing user interface 510.

Figure 5B:
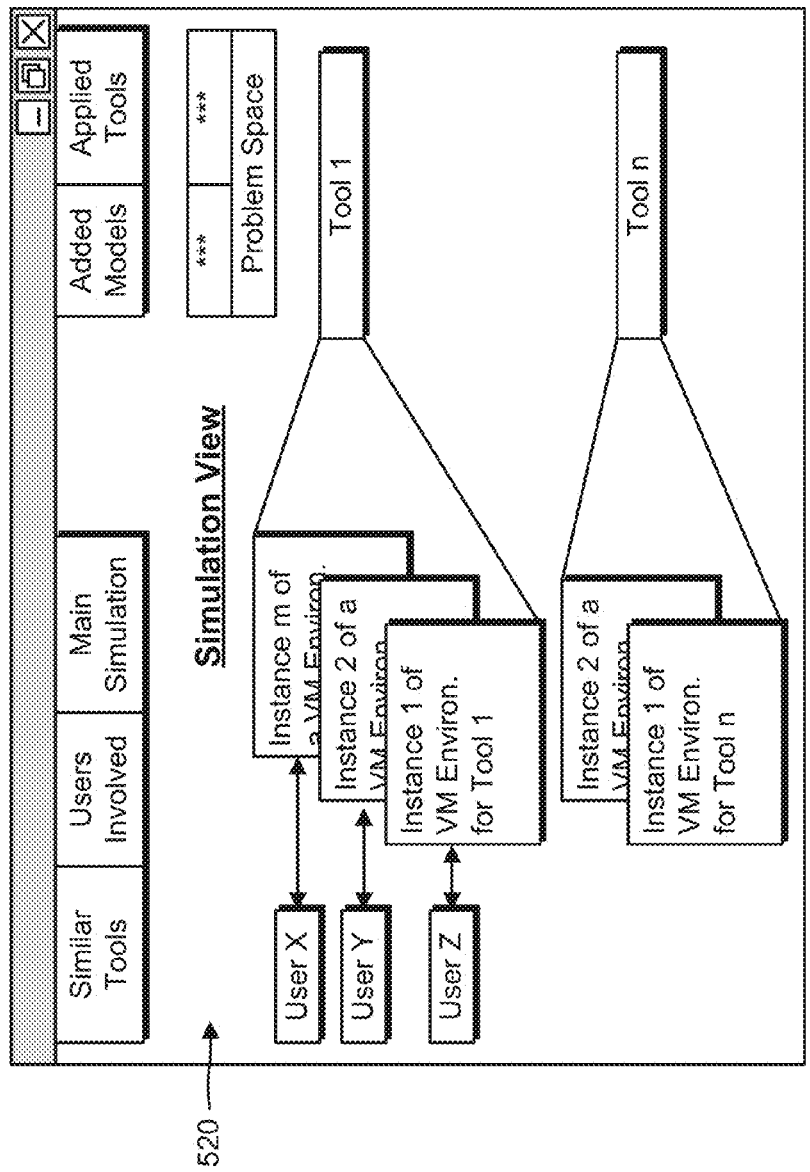

If the developer selects the simulation view mechanism in FIG. 5A, server device 220 may provide for display a user interface 520 as shown in FIG. 5B. User interface 520 may provide a simulation view that enables developers to input and manipulate one or more models; add and/or select a simulation, a transformation, and/or an analysis tool, technology, technique, method, etc.; assign model execution results to a model, to a search query, etc.

For example, user interface 520 may enable developers to input and/or manipulate a model that includes tools (e.g., Tool 1 through Tool n) and instances of virtual machine (VM) environments for the tools. The model may provide the first tool (Tool 1) and corresponding instances for users (e.g., User X, User Y, and User Z). As further shown in FIG. 5B, user interface 520 may include a problem space for defining a scope of a problem to be solved by the model displayed in user interface 520. User interface 520 may include a similar tools mechanism (e.g., a button, a link, an icon, etc.) that, when selected, may cause device 220 to provide for display a list of tools similar to the tools displayed in the model of user interface 520. User interface 520 may include a users involved mechanism (e.g., a button, a link, an icon, etc.) that, when selected, may cause device 220 to provide for display a list of developers associated with the model of user interface 520.

User interface 520 may include a main simulation mechanism (e.g., a button, a link, an icon, etc.) that, when selected, may cause device 220 to provide for display a simulation associated with the model of user interface 520. User interface 520 may include an added models mechanism (e.g., a button, a link, an icon, etc.) that, when selected, may cause device 220 to provide for display a list of models added to TCE-based search engine 225 and/or repository 230 by the developer viewing user interface 520. User interface 520 may include an applied tools mechanism (e.g., a button, a link, an icon, etc.) that, when selected, may cause device 220 to provide for display a list of tools applied to the model of user interface 520.

Figure 5C:
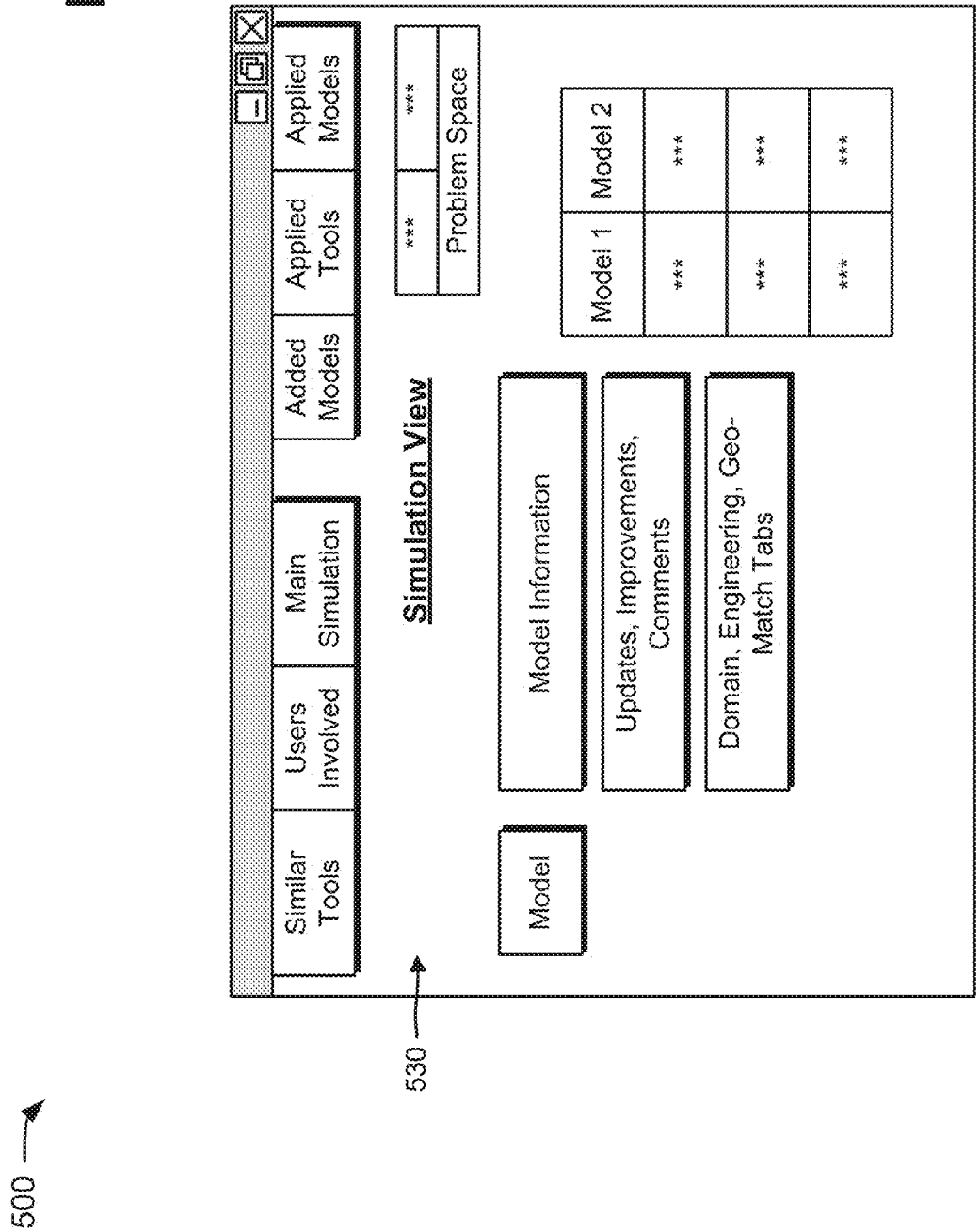

In some implementations, if the developer selects the simulation view mechanism in FIG. 5A, server device 220 may provide for display a user interface 530 as shown in FIG. 5C. User interface 530 may provide another simulation view that enables developers to input and manipulate one or more models; add and/or select a simulation, a transformation, and/or an analysis tool, technology, technique, method, etc.; assign model execution results to a model, to a search query, etc.

For example, as shown in FIG. 5C, user interface 530 may include a model (e.g., "Model 1," "Model 2," etc.) and a model information mechanism (e.g., a button, a link, an icon, etc.) that, when selected, may enable the developer to provide model information to TCE-based search engine 225 and/or repository 230. User interface 530 may include a mechanism (e.g., a button, a link, an icon, etc.) that, when selected, may enable the developer to provide updates, improvements, comments, etc., associated with the model, to TCE-based search engine 225 and/or repository 230. User interface 530 may include a domain mechanism (e.g., a button, a link, an icon, etc.) that, when selected, may enable the developer to provide a domain, associated with the model, to TCE-based search engine 225 and/or repository 230. The domain may include, for example, model-based design, development, diagnosis, or testing domains; a quality engineering domain; a failure management domain, a computational modeling domain; a computation and simulation domain; a standards domain; a tools domain; a model design environment domain; a technical language domain; etc.

In some implementations, user interface 530 may include a problem space, a similar tools mechanism, a users involved mechanism, a main simulation mechanism, an added models mechanism, an applied tools mechanism, and an applied models mechanism. The problem space, the similar tools mechanism, the users involved mechanism, the main simulation mechanism, the added models mechanism, and the applied tools mechanism of user interface 530 may include the features and functionality described above in connection with user interface 520 of FIG. 5B. The applied models mechanism, when selected, may cause device 220 to provide for display a list of models applied to the simulation accessible by user interface 530.

Figure 5D:
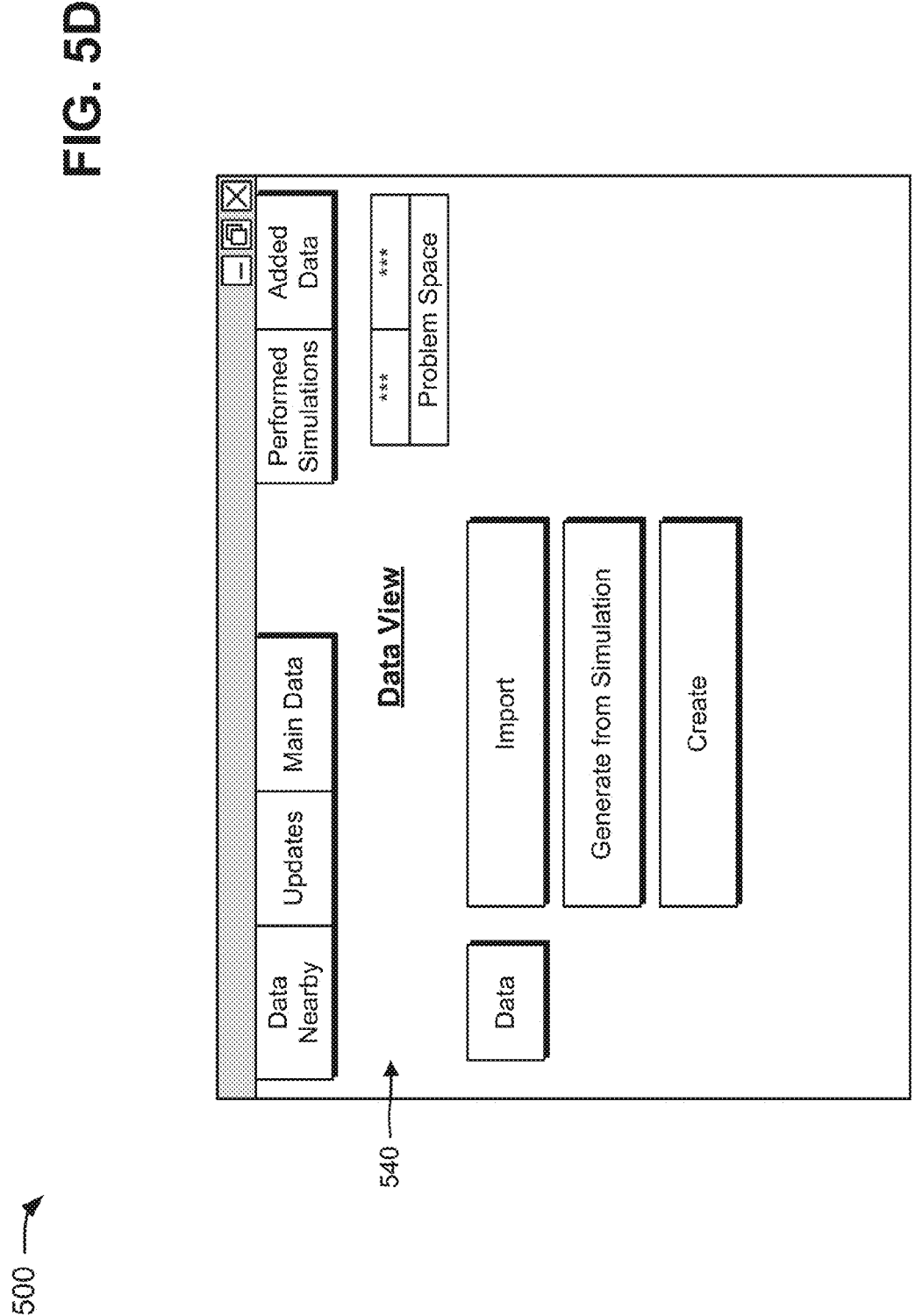

If the developer selects the data view mechanism in FIG. 5A, server device 220 may provide for display a user interface 540 as shown in FIG. 5D. User interface 540 may provide a data view that enables developers to manipulate (e.g., input, modify, update, delete, upload, download, transfer, etc.) data that may be provided to TCE-based search engine 225 and/or repository 230. In some implementations, the data view may enable developers to annotate a search query with data, for example, after the search query is transformed into a format understood by TCE-based search engine 225, as described below. In some implementations, the data view may enable the developers to manipulate and/or annotate the data (e.g., filter, reduce, simplify, etc.) based on the query. The manipulation may be based on, for example, application of a search algorithm, ontological information, information across ontologies (e.g., as mapping tree structures), etc. via, for example, search algorithms, an ontology application, a mapping trees application, etc. The annotation may be based on information publically available on the web. For example, the specific personalized query (e.g., "Will I make it to Philadelphia tomorrow?") may be annotated with data. The data may include information such as traffic during the trip, the weather forecast, current road conditions, traffic conditions for the type of a car that the user is intending to drive, etc., whereas other data may be excluded based on a personal profile of the person (i.e., "I") requesting the response to the query. For example, as shown in FIG. 5D, user interface 540 may include data (e.g., "Data") and an import mechanism (e.g., a button, a link, an icon, etc.) that, when selected, may enable the developer to import data into TCE-based search engine 225 and/or repository 230. User interface 540 may also include a generate mechanism (e.g., a button, a link, an icon, etc.) that, when selected, may enable the developer to generate data from a simulation and to provide the generated data to TCE-based search engine 225 and/or repository 230. User interface 540 may include a create mechanism (e.g., a button, a link, an icon, etc.) that, when selected, may enable the developer to create data and to provide the created data to TCE-based search engine 225 and/or repository 230.

As further shown in FIG. 5D, user interface 540 may include a problem space for defining a scope of a problem associated with the data displayed in user interface 540. User interface 540 may include a data nearby mechanism (e.g., a button, a link, an icon, etc.) that, when selected, may cause device 220 to provide for display data stored in a geographical location that is near the developer viewing user interface 540. User interface 540 may include an updates mechanism (e.g., a button, a link, an icon, etc.) that, when selected, may cause device 220 to provide for display updates associated with the data displayed in user interface 540. User interface 540 may include a main data mechanism (e.g., a button, a link, an icon, etc.) that, when selected, may cause device 220 to provide for display existing data in user interface 540.

User interface 540 may also include a performed simulations mechanism (e.g., a button, a link, an icon, etc.) that, when selected, may cause device 220 to provide for display a list of simulations performed with the data displayed in user interface 540. User interface 540 may include an added data mechanism (e.g., a button, a link, an icon, etc.) that, when selected, may cause device 220 to provide for display data that is added to TCE-based search engine 225 and/or repository 230 by the developer viewing user interface 540.

Figure 5E:
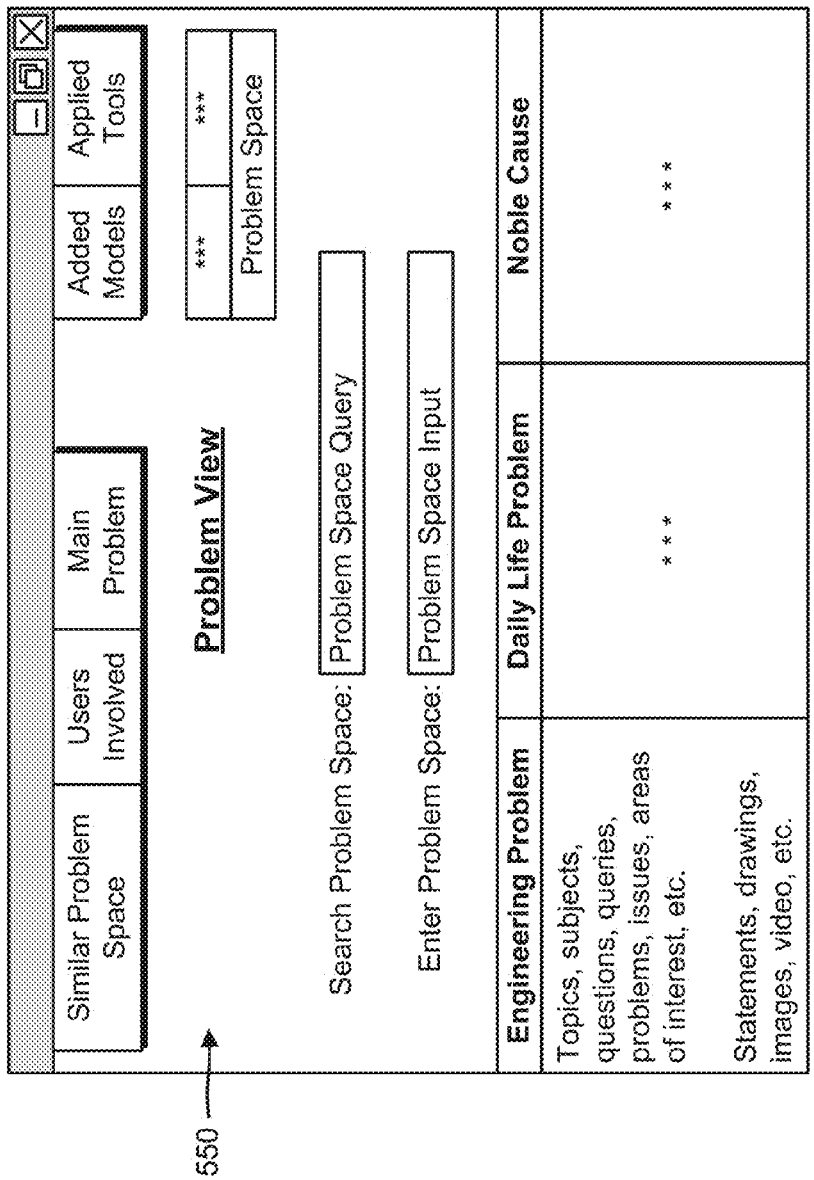

If the developer selects the problem view mechanism in FIG. 5A, server device 220 may provide for display a user interface 550 as shown in FIG. 5E. User interface 550 may provide a problem view that enables developers to manipulate (e.g., input, update, modify, delete, etc.) problem information (e.g., a problem, a cause, a verified cause, etc.) to be solved or partially solved. A verified cause may be provided by an authorized developer. A developer may be authorized, for example, by being rated by other developers as authorized or by passing a formal requirement test that evaluates the developer. The formal requirement test may include a test that verifies, for example, the developer's reliability, history, pedigree, credibility, affiliation, etc. In some implementations, the developer authorization may depend on a property of a verified cause, such as, for example, a trust certificate, etc.

For example, as shown in FIG. 5E, user interface 550 may include a section to search for a problem space (e.g., with a problem space query) that may be stored in repository 230. User interface 550 may also include a section to input a new problem space (e.g., with a problem space input) that may be provided to TCE-based search engine 225 and/or repository 230. User interface 550 may include a section to input engineering problem information (e.g., topics, subjects, questions, queries, problems, issues, areas of interest, statements, drawings, images, video, etc.) that may be provided to TCE-based search engine 225 and/or repository 230. User interface 550 may include a section to input daily life problem information that may be provided to TCE-based search engine 225 and/or repository 230. User interface 550 may include a section to input noble cause information that may be provided to TCE-based search engine 225 and/or repository 230.

In some implementations, the noble cause may include a socially-responsible cause that attempts to increase human awareness about a factual reality by analysis and/or simulation of information associated with the noble cause. The noble cause may attempt to create tolerance and positive feelings for the cause, increase empathy for the cause, and create a collaborative environment for a scientifically-founded understanding of the cause (e.g., that may include at least partial solutions for the cause).

As further shown in FIG. 5E, user interface 550 may include a problem space for defining a scope of a problem associated with the problem displayed in user interface 550. User interface 550 may include a similar problem space mechanism (e.g., a button, a link, an icon, etc.) that, when selected, may cause device 220 to provide for display problem space(s) that are similar to the problem displayed in user interface 550. User interface 550 may include a users involved mechanism (e.g., a button, a link, an icon, etc.) that, when selected, may cause device 220 to provide for display a list of developers associated with the problem of user interface 550. User interface 550 may include a main problem mechanism (e.g., a button, a link, an icon, etc.) that, when selected, may cause device 220 to provide for display existing information associated with the problem displayed in user interface 550.

User interface 550 may also include an added models mechanism (e.g., a button, a link, an icon, etc.) that, when selected, may cause device 220 to provide for display a list of models that are added to the problem displayed in user interface 550. User interface 550 may include an applied tools mechanism (e.g., a button, a link, an icon, etc.) that, when selected, may cause device 220 to provide for display a list of tools applied to the problem displayed in user interface 550.

Figure 5F:
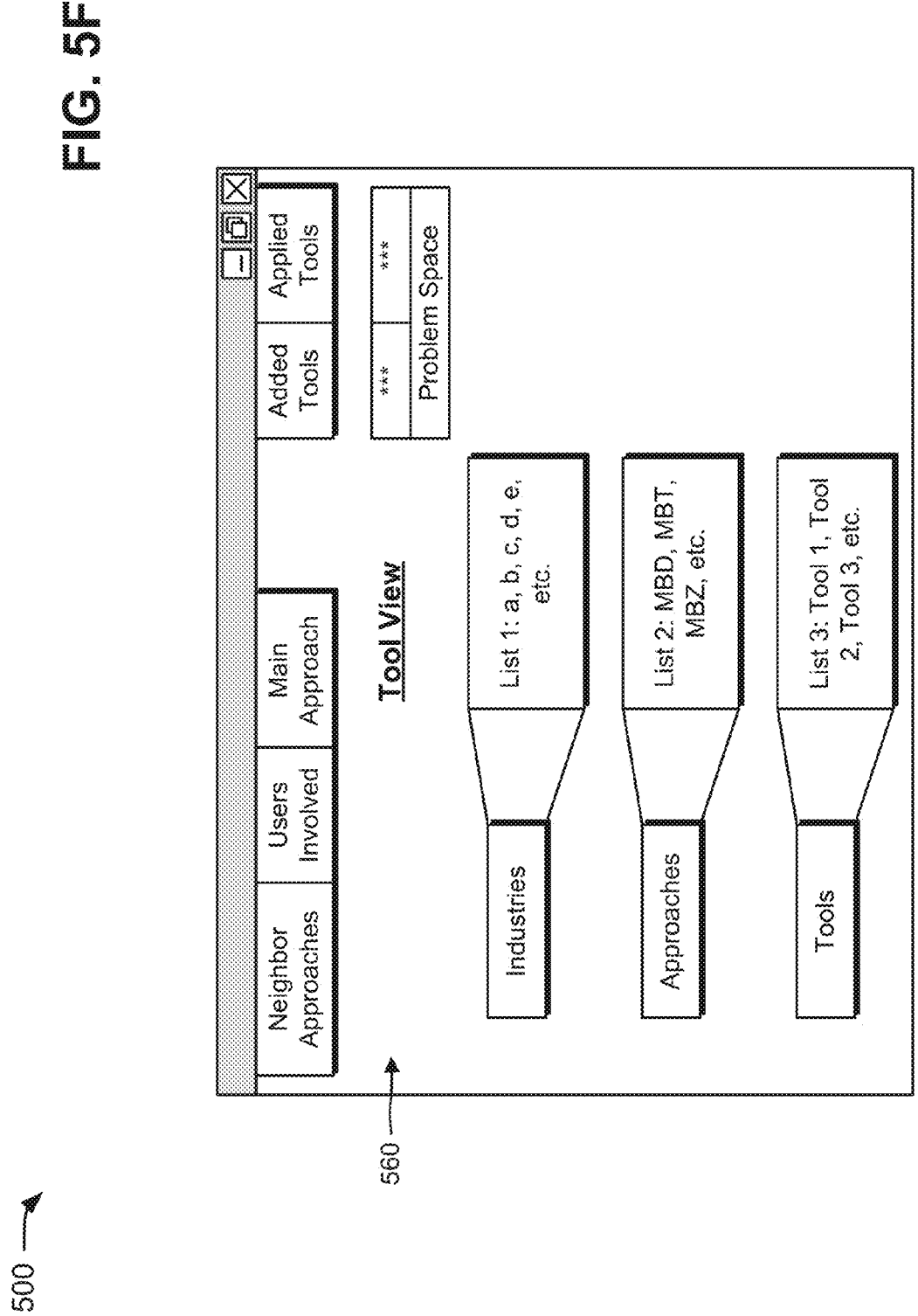

If the developer selects the tool view mechanism in FIG. 5A, server device 220 may provide for display a user interface 560 as shown in FIG. 5F. User interface 560 may provide a tool view that enables developers to perform actions (e.g., input, update, modify, delete, etc.) on an analysis and/or simulation tool, technology, technique, method, etc. related to a particular domain and/or problem space. The tool view may enable tool developers to provide a selected issue (e.g., a problem, a model, an element, etc.) to be analyzed and/or simulated. In some implementations, the tool view may include an extendable list of domains to which a tool or a tool developer may be assigned.

For example, user interface 560 may enable developers to input and/or manipulate tools (e.g., Tool 1, Tool 2, Tool 3, etc.), approaches to tool design, industries associated with the tools, etc. As further shown in FIG. 5F, user interface 560 may include a problem space for defining a scope of a problem to be solved by the tools displayed in user interface 560. User interface 560 may include a neighbor approaches mechanism (e.g., a button, a link, an icon, etc.) that, when selected, may cause device 220 to provide for display approaches by other developers in geographical locations that are near the developer viewing user interface 560. User interface 520 may include a users involved mechanism (e.g., a button, a link, an icon, etc.) that, when selected, may cause device 220 to provide for display a list of developers associated with the tools of user interface 560.

User interface 560 may include a main approach mechanism (e.g., a button, a link, an icon, etc.) that, when selected, may cause device 220 to provide for display a main approach associated with the tools of user interface 560. User interface 560 may include an added tools mechanism (e.g., a button, a link, an icon, etc.) that, when selected, may cause device 220 to provide for display a list of tools added to TCE-based search engine 225 and/or repository 230 by the developer viewing user interface 560. User interface 560 may include an applied tools mechanism (e.g., a button, a link, an icon, etc.) that, when selected, may cause device 220 to provide for display a list of tools applied in user interface 560.

Figure 5G:
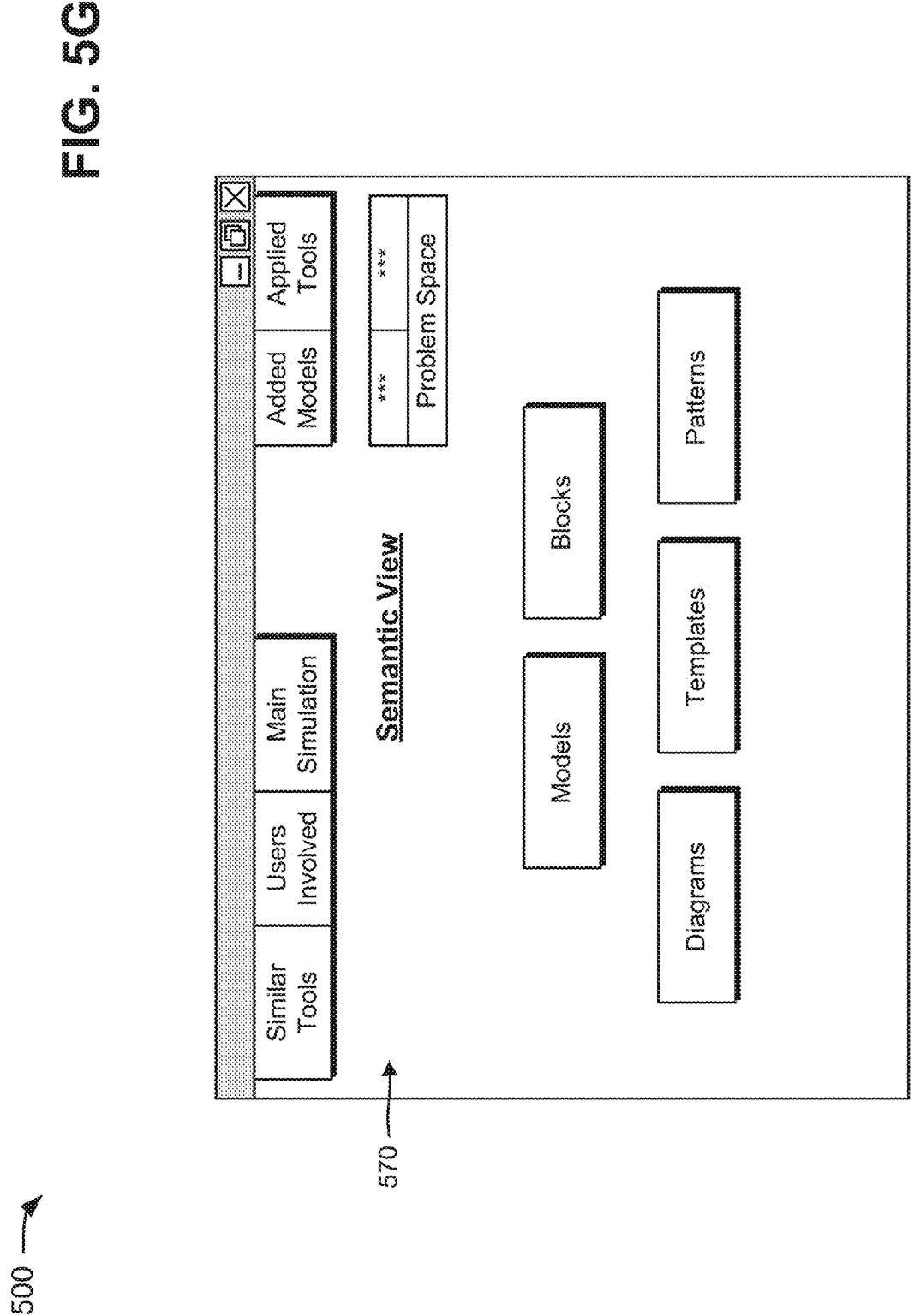

If the developer selects the semantic view mechanism in FIG. 5A, server device 220 may provide for display a user interface 570 as shown in FIG. 5G. User interface 570 may provide a semantic view that enables developers to manipulate (e.g., input, update, modify, delete, share, rate, etc.) semantic descriptions for simulation by using, for example, source code, models, blocks of models, diagrams, templates of models, patterns of models, etc.

For example, user interface 570 may include a models mechanism (e.g., a button, a link, an icon, etc.) that, when selected, enables developers to manipulate semantic descriptions for simulation of models. User interface 570 may include a blocks mechanism (e.g., a button, a link, an icon, etc.) that, when selected, enables developers to manipulate semantic descriptions of blocks for simulation.

User interface 570 may also include a diagrams mechanism (e.g., a button, a link, an icon, etc.) that, when selected, enables developers to manipulate semantic descriptions for simulation by means of a diagram. User interface 570 may include a templates mechanism (e.g., a button, a link, an icon, etc.) that, when selected, enables developers to manipulate semantic descriptions for simulation by means of a template (e.g., an abstract model structure from which a concrete model structure may be generated and where the generation may be based on a set of template parameters). User interface 570 may include a patterns mechanism (e.g., a button, a link, an icon, etc.) that, when selected, enables developers to manipulate semantic descriptions for simulation by means of a pattern (e.g., a concrete structure that may include concrete parameters).

As further shown in FIG. 5G, user interface 570 may include a problem space for defining a scope of a problem that is associated with the semantics of user interface 570. User interface 570 may include a similar tools mechanism (e.g., a button, a link, an icon, etc.) that, when selected, may cause device 220 to provide for display a list of tools associated with the semantics of user interface 570. User interface 570 may include a users involved mechanism (e.g., a button, a link, an icon, etc.) that, when selected, may cause device 220 to provide for display a list of developers associated with the semantics of user interface 570.

User interface 570 may include a main simulation mechanism (e.g., a button, a link, an icon, etc.) that, when selected, may cause device 220 to provide for display a simulation associated with the semantics of user interface 570. User interface 570 may include an added models mechanism (e.g., a button, a link, an icon, etc.) that, when selected, may cause device 220 to provide for display a list of models added to TCE-based search engine 225 and/or repository 230 by the developer viewing user interface 570. User interface 570 may include an applied tools mechanism (e.g., a button, a link, an icon, etc.) that, when selected, may cause device 220 to provide for display a list of tools applied to the semantics of user interface 570.

Figure 5H:
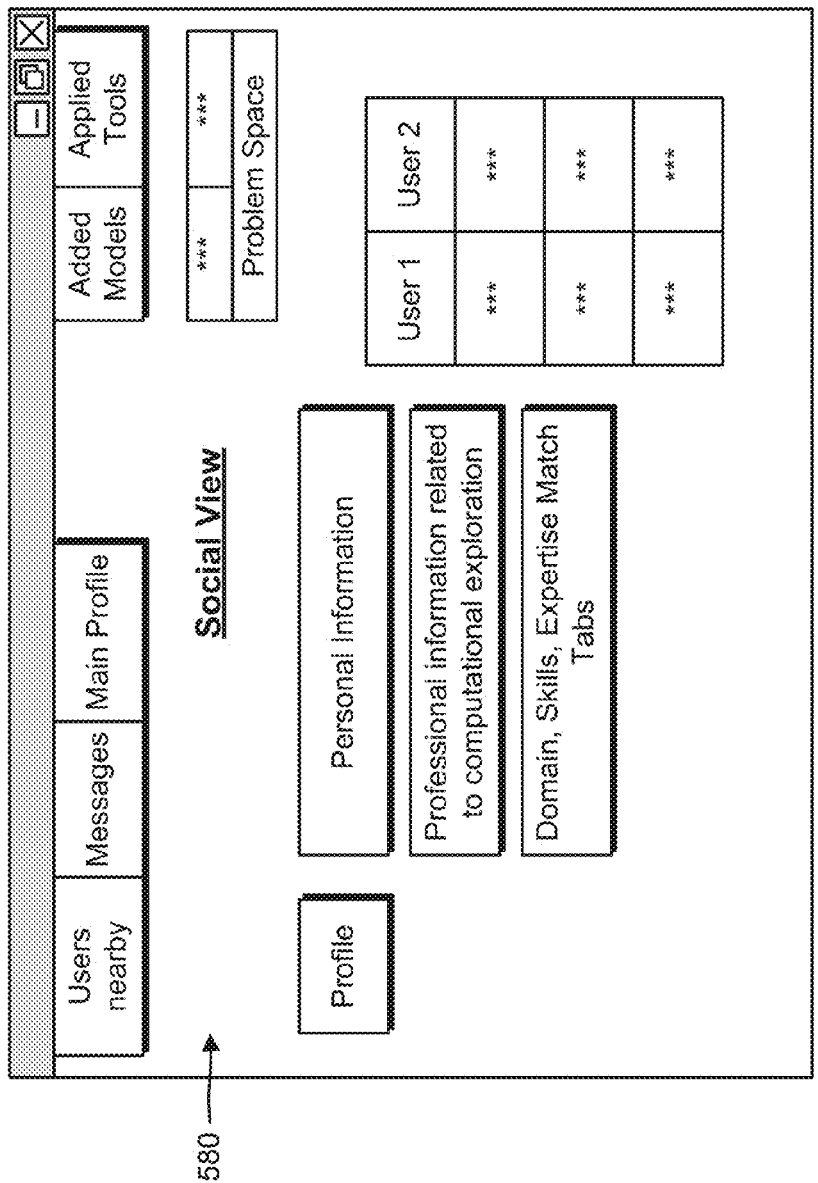

If the developer selects the social view mechanism in FIG. 5A, server device 220 may provide for display a user interface 580 as shown in FIG. 5H. User interface 580 may provide a social view that enables developers to manipulate (e.g., input, modify, delete, share, rate, comment, update, discuss, etc.) developer profiles, track manipulation activities, relate a developer to another developer (e.g., based on geographical proximity), relate a developer to a skill set, relate a developer to other developers based on a skill proximity analysis, etc. The skill proximity analysis may include a mechanism that compares different social, professional, and/or other skills, and prioritizes the skills so that developers may be related to each other and located and/or selected based on the skill proximity analysis. Personality type matches, complementary skill matches, and other proximities may be computed and illustrated in the social view.

For example, as shown in FIG. 5H, user interface 580 may include a profile (e.g., for "User 1," "User 2," etc.) and a personal information mechanism (e.g., a button, a link, an icon, etc.) that, when selected, may enable the developer to provide personal information to TCE-based search engine 225 and/or repository 230. User interface 580 may include a professional information mechanism (e.g., a button, a link, an icon, etc.) that, when selected, may enable the developer to provide professional information (e.g., related to computational exploration) to TCE-based search engine 225 and/or repository 230. User interface 580 may include a domain mechanism (e.g., a button, a link, an icon, etc.) that, when selected, may enable the developer to provide a domain, skills, expertise, etc., of the developer, to TCE-based search engine 225 and/or repository 230.

As further shown in FIG. 5H, user interface 580 may include a problem space for defining a scope of a problem that is associated with the developer viewing user interface 580. User interface 580 may include a users nearby mechanism (e.g., a button, a link, an icon, etc.) that, when selected, may cause device 220 to provide for display a list of developers located geographically near (e.g., within a predetermined distance) the developer viewing user interface 580. User interface 580 may include a messages mechanism (e.g., a button, a link, an icon, etc.) that, when selected, may cause device 220 to provide for display messages (e.g., email messages, instant messages, etc.) associated with the developer viewing user interface 580. User interface 580 may include a main profile mechanism (e.g., a button, a link, an icon, etc.) that, when selected, may cause device 220 to provide for display a profile associated with the developer viewing user interface 580.

User interface 580 may include an added models mechanism (e.g., a button, a link, an icon, etc.) that, when selected, may cause device 220 to provide for display a list of models added to TCE-based search engine 225 and/or repository 230 by the developer viewing user interface 580. User interface 580 may include an applied tools mechanism (e.g., a button, a link, an icon, etc.) that, when selected, may cause device 220 to provide for display a list of tools applied by the developer viewing user interface 580.

Figure 5I:
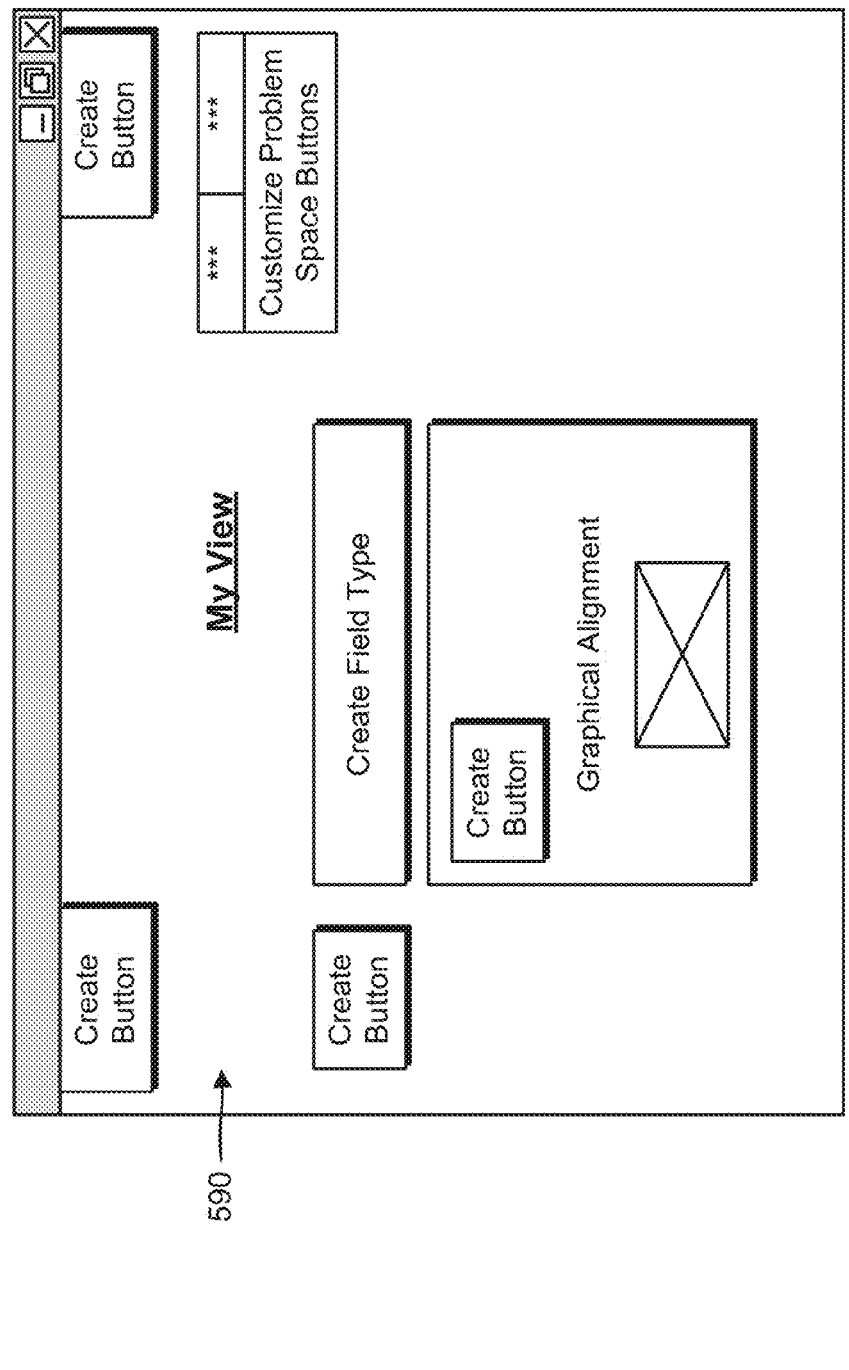

If the developer selects the my view mechanism in FIG. 5A, server device 220 may provide for display a user interface 590 as shown in FIG. 5I. User interface 590 may provide a my view that enables developers to create new views for developer-specific requirements and to manipulate (e.g., input, update, modify, delete, share, rate, etc.) the newly created views. For example, as shown in FIG. 5I, user interface 590 may enable developers to create buttons or other types of mechanism (e.g., links, icons, etc.), to create field type mechanisms, to create customized problem space buttons, to create graphical information, to create textual information, etc. for new views. In some implementations, the new views may be utilized by developers to provide information to TCE-based search engine 225 and/or repository 230.

In some implementations, different types of users may be provided access to one or more of the views. For example, a mass-scale user may be provided access to the social view; a domain expert may be provided access to the social view, the problem view, and the data view; a modeler may be provided access to the social view, the simulation view, and the data view; a tool provider may be provided access to the tool view and the data view; an execution engine user may be provided access to the semantic view; all users may be provided access to the my view; etc. In some implementations, one or more of the views may enable different developers to consult, discuss, share, rate, document, comment, etc. about information provided via the views.

In some implementations, TCE-based search engine 225 may be created via a social business network of developers that provide information to TCE-based search engine 225. The social business network may combine characteristics of a social network and a business or professional network, and may be customized to provide the views described herein. For example, when a developer utilizes the social view to create a new profile, professional information related to the developer may be mandatory, whereas social information related to the developer may be optional. Further, when the profile is created, the social view may enable the developer to indicate why the developer joined the social business network. For example, the social view may display a question such as, "why did you join the network today?" The developer may respond to the question with one of the following example responses: to learn, to teach, to play, to simulate, to meet somebody with the same knowledge level, to meet a qualified professional with the same skill set, to meet a tool provider, to offer a service, to offer knowledge, to outsource, to crowdsource, to create, to model, to enter a problem space, to collect points, to collect rewards, to offer a tool, to use a tool, to trade points, etc.

In some implementations, the social business network may enable developers to communicate and consult with each other about information provided to TCE-based search engine 225 and/or repository 230. The social business network may enable developers to perform different activities, such as, for example, teach, learn, collect rewards and/or points, trade rewards and/or points, provide recommendations and referrals, solve a problem, etc. For example, the social business network may enable developers to connect and/or interact with colleagues, friends, coworkers, etc. in predefined and/or self-defined subject-oriented circles; to acquire information about what is possible with certain type of model design environments, tools, tool providers, technologies, etc.; to obtain information about what model-design environments, tools, and/or technologies are compatible; to obtain information about what methods and/or methodologies are compatible; to obtain information about what type of computational models exist; to obtain information about capabilities that exist when performing computational exploration for models; to observe analysis results and further analyze and understand the results; to obtain indications of how to improve the process of discovery; etc. For example, a user may declare an interest in a certain set of tools that are compatible with a specific indicated tool. Those who are part of the network where this declaration may be shared may then provide information that is related to this interest, for example to help the user quickly find compatible tools.

For example, a developer may utilize the social business network to improve reasoning about progress made in robotics by applying TCE-based search engine 225 and/or repository 230. The developer may create a problem statement that stimulates a set of discussions on computation in robotics and/or on progress in model-based development, engineering, and dedicated computational exploration. The problem statement may be linked to model design environments (e.g., tools, technologies, methods, methodologies, logic, source code, search engines, etc.), models, and/or applications. The problem statement may be connected with case studies existing in repository 230, and may be linked to current research results. The problem statement may identify other developers in the social business network working on similar problems, and may help identify leading developers associated with the problem. The problem statement may encourage other developers to add information that explains the problem in detail and/or indicates alternative solutions. The problem statement may provide information that indicates progress for similar problem statements in other domains, such as, biomechanics, humanoids development, neurology, brain emotions mapping for robots, etc.

In some implementations, the social business network may provide special-offer advertisements for tool providers, a signup bonus for developers (e.g., free points credit for certain activities), a bonus for a recommendation (e.g., valued according to criteria, such as a number of downloads, a rating value, a user review, etc.), a submission bonus for adding models to repository 230, a bonus for a company signup, social interaction referrals, points for working on a good cause, points for working on engineering problems, blogs, tagging, status setting, notifications, rating mechanisms, etc.

Example Process for Transforming a Search Query into a Format Understood by the TCE-Based Search Engine FIG. 6 is a flow chart of an example process 600 for transforming a search query into a format understood by TCE-based search engine 225. In some implementations, process 600 may be performed by the standalone server device 220 and/or repository 230. In some implementations, process 600 may be performed by another device or a group of devices (e.g., server device 220/repository 230 of cloud computing environment 240) separate from or including the standalone server device 220/repository 230.

As shown in FIG. 6, process 600 may include providing for display a TCE-based search engine user interface (block 610). For example, server device 220 may provide a user interface associated with TCE-based search engine 225 to user device 210, and user device 210 may provide the user interface for display to a search query user, a developer, etc. In some implementations, the user interface associated with TCE-based search engine 225 may include a field for inputting a search query, a field for providing an answer to a search query, advertising information, a mechanism (e.g., a user name, a password, etc.) for the search query user to log into TCE-based search engine 225, a mechanism (e.g., a user name, a password, etc.) for the developer to log into TCE-based search engine 225, any of the information described above for user interfaces 510-590 (FIGS. 5A-5I), etc.

As further shown in FIG. 6, process 600 may include receiving a query from a user via the TCE-based search engine user interface (block 620). For example, the search query user may provide a search query (e.g., "Will I make it to Philadelphia tomorrow?") to user device 210 via the user interface associated with TCE-based search engine 225 (e.g., via the field for inputting a search query). User device 210 may provide the received search query to server device 220, and server device 220 may receive the search query.

In some implementations, the search query may include one or more sequences of characters that request an answer. In some implementations, the search query may include information, such as, for example, data (e.g., input data for a model, output data for a reactive behavioral model, etc.), parameters (e.g., configuration parameters, transformation parameters, abstract parameters, etc.), etc. In some implementations, the search query may include information associated with one or more models that may be related to the information requested by the search query. In some implementations, the search query may include structured text or query specific syntax. The search query may be formulated in a specific syntax and/or it may be automatically and/or semi-automatically transformed to a specific syntax based on the semantics of the query elements and/or based on the built-in parser, interpreter, human (e.g., Amazon Mechanical Turk) translation, and/or translator activities. The search query may be constructed and/or transformed to a query that is, for example, allowing for prediction-based responses and/or one or more prediction scenarios. The search query may result in a historical data-based response and/or it may result in forecasts for selected query elements.

In some implementations, a natural language may be used. In other implementations, a query language may be used (e.g., a general purpose query language, such as SQL, SPARQL, etc.). In yet other implementations, a TCE-specific query language may be created and/or applied. Prediction may then be defined as a response to the query. The prediction may comprise multiple scenarios.

In some implementations, TCE-based engine 225 may provide results in the form of model-based predictions. A model required for this prediction may be a dynamic model (e.g., based on differential equations, difference equations, discrete events, discrete states, etc.) that includes numerical algorithms and/or solvers (e.g., integration, control, optimization algorithms, delay blocks, continuous-time elements, discrete-time elements, discrete-event elements, etc.) that may be executed based on Partial Differential Equations, Linear Algebra, Ordinary Differential Equations, Finite Element Analysis, Computational Fluid Dynamics Models, etc. Hybrid configurations of the above may be available for the model-based prediction. System identification methods may be used to further setup the model. Static analysis methods may be used to enhance the predictions, such as, for example, predictions by the dynamic models.

The specification of the search query may be limited. It may require specific implicit or explicit elements (e.g., explicit naming of the elements, pre-defined structures, a selection of specific variables, and/or a selection of specific rules). The specification of the search query may use explicit methods to allow for extracting information. These methods may include multiple linguistic elements (e.g., subject, object, and predicate elements; clauses; phrases; conditions; compound sentences; entity and attribute relations; causes; effects; etc.).

The search query may then be transformed to a TCE-specific query language. This query language may allow TCE-specific operations, actions, and requests (e.g., setting parameter and/or variable values, getting parameter and/or variable values, setting initial values, model execution, etc.).

Further, the TCE-specific query language may allow for providing inputs, gathering output signals, comparing signals, determining differences between signals, etc. A TCE-specific query language may include elements that may be relevant for and/or allow performing simulation of models (e.g., set error tolerance (relative and absolute), provide configuration parameters to the model (e.g., whether to use root-finding for indicator functions, whether to employ a variable step size, etc.), select model processing methods (e.g., automatic resolution of transitions between sample rates, etc.) etc.

The TCE-specific query language may provide facilities to include logging data, refer back to logged data and use these data as input in future executions, perform parameter studies, graph results, perform parameter estimation by comparing desired output with actual output, adjust parameters based on this comparison (e.g., using optimization methods).

The TCE-specific query language may further allow for specifying and interrogating verification properties (e.g., safety, reachability, liveliness, etc.) of the model.

The TCE-specific query language may allow for formulating assumptions for models, conditions (e.g., on signal rangers), properties of signals, regular and/or symbolic expressions, and/or to analyze vectors, arrays, matrices, etc. Additionally, or alternatively, the TCE-specific query language may allow for transforming between time domain and frequency domain, performing studies in frequency domain, etc.

As further shown in FIG. 6, process 600 may include dividing the query into one or more query elements (block 630). For example, server device 220 may divide (or parse) the search query into one or more query elements. The query elements may include characters, terms, words, etc. of the search query that may be used to determine what is being requested by the search query. For example, the search query (e.g., "Will I make it to Philadelphia tomorrow?") may be divided into query elements "will," "I," "make," "it," "to," "Philadelphia," and "tomorrow." The query elements may indicate that a distance between a current location of the search query user and the location of Philadelphia is being requested by the search query user.

Returning to FIG. 6, process 600 may include processing the query element(s) based on query content, information requested by the query, one or more models, and/or one or more model execution results (block 640). For example, server device 220 may process the query elements based on content of the search query, information requested by the search query (e.g., as determined by the query elements), one or more models that may be associated with the search query, execution result(s) of the one or more models, etc. In some implementations, server device 220 may process the query elements, based on the aforementioned information, to generate processed query elements. The processed query elements may include identifiers that are associated with the query elements. For example, the query element "will" may be identified as a question, the query element "I" may be identified as personal information, the query element "make" may be identified as a distance, the query element "it" may be identified as a location, the query element "to" may be identified as a distance, the query element "Philadelphia" may be identified as a location, and the query element "tomorrow" may be identified as a time period.

In some implementations, server device 220 may associate one or more models with the search query, and may execute the model(s), based on the query elements, to generate results. For example, server device 220 may determine that a distance calculation model is needed for the search query (e.g., "Will I make it to Philadelphia tomorrow?"), and may execute one or more distance calculation models to generate results (e.g., distances from the search query user's location to Philadelphia). The distance calculation models may generate different distances for the search query (e.g., distance by car, actual distance, distance via highways, etc.).

In some implementations, server device 220 may determine whether the search query requests performance of a prediction analysis. For example, if the search query requests how much it will snow, server device 220 may determine that the search query requests performance of a prediction analysis since forecasting weather involves prediction techniques. In some implementations, server device 220 may use or adapt personal information about the search query user when processing the search query. For example, if the search query requests how much it will snow, server device 220 may determine a current location of the search query user and may assume that the snow prediction is for the current location. If the search query requests "will I have to spend time getting snow off my car tomorrow," TCE-based search engine 225 may determine a location of the car, a direction of the wind, whether there are buildings shielding the car, whether there are other cars around the car, a forecasted snow fall, temperatures, what kind of snow (e.g., heavy versus light), etc., and then answer whether the user will spend five, ten, etc. minutes getting the car clear of snow.

As further shown in FIG. 6, process 600 may include transforming the query into another query, understood by the TCE-based search engine, based on the processed query element(s) (block 650). For example, server device 220 may transform the search query into a format understood by TCE-based search engine 225 based on the processed query elements. In some implementations, server device 220 may transform the search query from its initial phrasing to another query or queries understood by TCE-based search engine 225. The transformed query may include, for example, model input data, model configuration parameter(s), model configuration setting(s), tool data, tool configuration parameter(s), etc. In some implementations, the transformed query may include personal information about the search query user, annotations, etc.

In some implementations, if server device 220 determines that a distance calculation model is needed for the search query (e.g., "Will I make it to Philadelphia tomorrow?"), server device 220 may transform the search query into inputs for a distance calculation model. The inputs may include a model type input (e.g., a distance calculation model), a distance input (e.g., miles), a first location input (e.g., the location of the search query user), a second location input (e.g., the location of Philadelphia), and other inputs (e.g., a driving distance input, a geographical distance input, a current location, a transportation means, business needs, etc.). Since the transformed query may include inputs for one or more models, TCE-based search engine 225 may understand the transformed query and may use the inputs to search for one or more models that may provide an answer to the search query.

In some implementations, server device 220 may determine whether the search query is looking to determine whether the user will make it to Philadelphia tomorrow based on a vehicle owned by the user (e.g., an electric vehicle). TCE-based search engine 225 may have information about what car the user drives, what a current battery charge is for the car, how much the car will charge before the user departs, how much energy the car requires over a particular trajectory, elevations, speed changes, distance to recharging stations, weather conditions, etc. If TCE-based search engine 225 determines that the user will not make it to Philadelphia, TCE-based search engine 225 may change a set point of a house air conditioner or heater (e.g., at a house that provides electricity to the car) so that the car battery is sufficiently charged in the morning. In other words, TCE-based search engine 225 may actively control physical parameters to satisfy a search query. TCE-based search engine 225 may automatically recalibrate a general model for the electric car during the drive to Philadelphia. For example, originally the general model of a particular car may be used to make predictions, but when the user starts driving to Philadelphia, the car model may be continuously updated based on measurements of car actuators and sensors that are transmitted to TCE-based search engine 225. In fact, TCE-based search engine 225 may retrieve a model from the repository and tag it to "automatically update with my vehicle parameters" so that this recalibration may continuously performed during regular use of the car. Thus, TCE-based search engine 225 may automatically and continuously tune and/or calibrate a personalized model stored in a repository, which may require automated system/parameter identification.

In some implementations, the transformed query may be annotated with query-related information (e.g., historical data, related data, model information, dynamic behavior, etc.). The transformation of the search query may be facilitated with search algorithms (e.g., using search engines, search methods, etc.). In some implementations, server device 220 may process the search query with an ontology and/or mapping trees. An ontology may be a collection of information about a query subject, such as any item requested by the search query user.

Returning to FIG. 6, process 600 may include providing the other query to the TCE-based search engine (block 660). For example, server device 220 may provide the other query (e.g., the transformed search query) to TCE-based search engine 225 so that TCE-based search engine 225 may utilize the transformed query to search for one or more models that may provide an answer to the search query. In some implementations, server device 220 may store the transformed query in repository 230.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Search Query Transformation

Figure 7B:
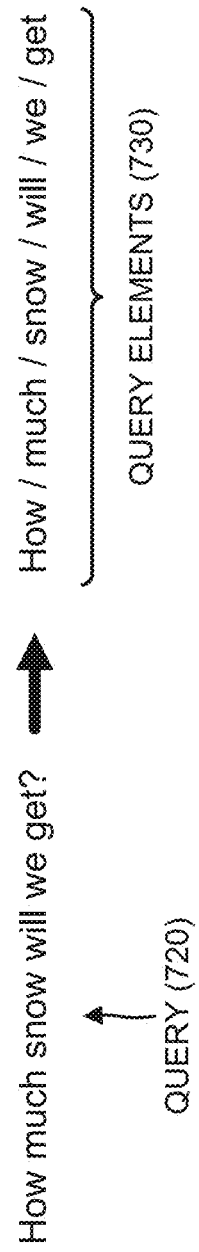

FIGS. 7A-7E are diagrams of an example 700 of the process described above with respect to FIG. 6. In example 700, assume that server device 220 generates a user interface 710 associated with TCE-based search engine 225, and provides user interface 710 to user device 210. Further assume that user device 210 provides user interface 710 for display to a search query user, as shown in FIG. 7A. In some implementations, user interface 710 may include a field for inputting a search query, a field for providing an answer to a search query, advertising information, a mechanism for the search query user to log into TCE-based search engine 225, etc. As further shown in FIG. 7A, further assume that the search query user provides a search query 720 (e.g., "How much snow will we get?") to user device 210 via user interface 710 (e.g., via the field for inputting a search query). User device 210 may provide the received search query 720 to server device 220, and server device 220 may receive search query 720.

In example 700, further assume that server device 220 divides (or parses) search query 720 into one or more query elements. The query elements may include characters, terms, words, etc. of search query 720 that may be used to determine what is being requested by search query 720. For example, as shown in FIG. 7B, search query 720 (e.g., "How much snow will we get?") may be divided into query elements 730 "how," "much," "snow," "will," "we," and "get." Query elements 730 may indicate that an amount of snow, at a current location of the search query user and over a particular time period, is being requested by search query 720.

Figure 7C:
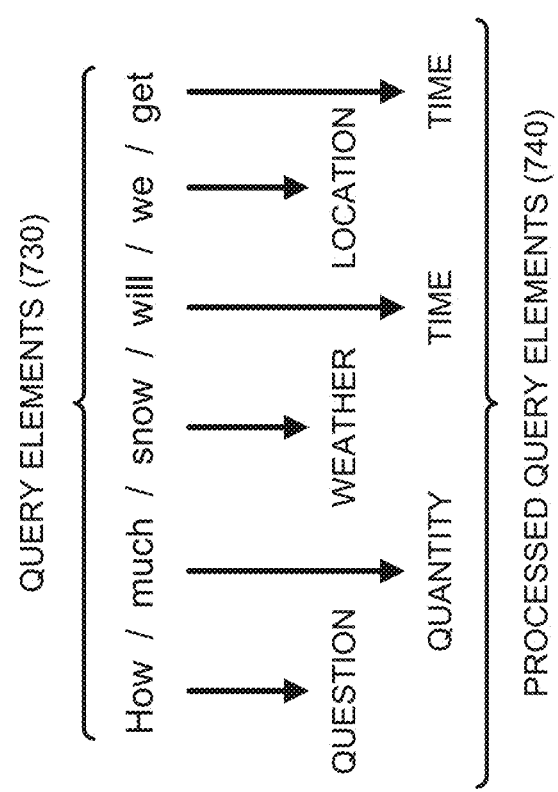

In example 700, further assume that server device 220 processes query elements 730 based on content of search query 720, information requested by search query 720, one or more models that may be associated with search query 720, execution result(s) of the one or more models, etc. As shown in FIG. 7C, server device 220 may process query elements 730, based on the aforementioned information, to generate processed query elements 740. Processed query elements 740 may include identifiers that are associated with query elements 740. For example, as further shown in FIG. 7C, query element 730 "how" may be identified as a question, query element 730 "much" may be identified as a quantity, query element 730 "snow" may be identified as weather, query element 730 "will" may be identified as a time, query element "we" may be identified as a location, and query element "get" may be identified as a time.

In some implementations, server device 220 may associate one or more models with search query 720, and may execute the model(s), based on query elements 730, to generate results. For example, server device 220 may determine that a weather model is needed for search query 720 (e.g., "How much snow will we get?"), and may execute one or more weather models to generate results (e.g., a predicted amount of snow at the current location of the search query user). The weather models may generate different amounts of snow for search query 720 (e.g., 12 inches, 14 inches, etc.), and server device 220 may average the snow amounts or provide a range of snow amounts. In some implementations, server device 220 may determine that search query 720 requests performance of a prediction analysis since forecasting weather involves prediction techniques. Server device 220 may use or adapt personal information about the search query user when processing search query 720. For example, server device 220 may determine a current location of the search query user and may assume the snow prediction is for the current location.

Figure 7D:

In example 700, further assume that server device 220 transforms search query 720 into a format understood by TCE-based search engine 225 based on processed query elements 740. In some implementations, server device 220 may transform search query 720 from its initial phrasing to a transformed query 750 or queries understood by TCE-based search engine 225, as shown in FIG. 7D. Transformed query 750 may include, for example, model input data, model configuration parameter(s), model configuration setting(s), tool data, tool configuration parameter(s), personal information about the search query user, annotations, etc.

Based on processed query elements 740, assume that server device 220 determines that a weather model is needed for search query 720 (e.g., "How much snow will we get?"), and transforms search query 720 into inputs for a weather model. As shown in FIG. 7D, the inputs of transformed query 750 may include a model type input (e.g., a weather model), a quantity input (e.g., inches), a weather input (e.g., snow), a location input (e.g., the current location of the search query user, Natick, Mass.), and a time input (e.g., 24 hours). Server device 220 may provide transformed search query 750 to TCE-based search engine 225 so that TCE-based search engine 225 may utilize the inputs of transformed search query 750 to search for one or more weather models that may provide an answer to search query 720. In some implementations, server device 220 may store transformed search query 750 in repository 230.

Example Process for Generating Results to a Search Query with the TCE-Based Search Engine FIG. 8 is a flow chart of an example process 800 for generating results to a search query with the TCE-based search engine 225. In some implementations, process 800 may be performed by the standalone server device 220 and/or repository 230. In some implementations, process 800 may be performed by another device or a group of devices (e.g., server device 220/repository 230 of cloud computing environment 240) separate from or including the standalone server device 220/repository 230.

As shown in FIG. 8, process 800 may include receiving a query understood by a TCE-based search engine (block 810). For example, server device 220 may receive a search query from user device 210, and may generate a transformed search query (e.g., transformed search query 750, FIG. 7D) from the search query, as described above in connection with FIGS. 6-7D. The transformed search query may be in a format understood by TCE-based search engine 225. In some implementations, server device 220 may provide the transformed search query to TCE-based search engine 225. In some implementation, server device 220 may store the transformed search query in repository 230.

As further shown in FIG. 8, process 800 may include determining information requested by the query (block 820). For example, server device 220 (e.g., TCE-based search engine 225) may determine information requested by the transformed search query based on inputs of the transformed search query. In some implementations, a transformed search query (e.g., "Will I make it to Philadelphia tomorrow?") may include a model type input (e.g., a distance calculation model), a distance input (e.g., miles), a first location input (e.g., the location of the search query user), a second location input (e.g., the location of Philadelphia), and other inputs (e.g., a driving distance input, a geographical distance input, etc.). Based on these inputs, server device 220 may determine that a distance calculation, from the search query user's location to Philadelphia, is requested by the transformed search query.

Returning to FIG. 8, process 800 may include selecting one or more TCE models from a repository based on the information requested by the query (block 830). For example, server device 220 (e.g., TCE-based search engine 225) may utilize the information requested by the transformed search query to select one or more TCE models from repository 230. In some implementations, server device 220 may compare the requested information to model information stored in repository 230, and may select model(s) with information that matches the requested information. In some implementations, server device 220 may compare inputs of the transformed search query to model information stored in repository 230, and may select model(s) with information that matches the inputs. In some implementations, server device 220 (e.g., TCE-based search engine 225) may utilize the information requested by the transformed search query to select one or more tools, data, problems, etc. from repository 230.

As further shown in FIG. 8, process 800 may include providing the information requested by the query to the selected TCE model(s) (block 840). For example, server device 220 (e.g., TCE-based search engine 225) may provide the information requested by the transformed search query to the selected TCE model(s) from repository 230. For the transformed search query (e.g., "Will I make it to Philadelphia tomorrow?"), server device 220 may provide the inputs of the transformed search query (e.g., the model type input, the distance input, the first location input, the second location input, and the other inputs) to the selected TCE model(s). In some implementations, server device 220 may retrieve the selected TCE model(s) from repository 230, and may store the selected TCE model(s) in server device 220. In such implementations, server device 220 may provide the information requested by the transformed search query to the selected TCE model(s) stored in server device 220.

Returning to FIG. 8, process 800 may include executing the selected TCE model(s), based in the information requested by the query, to generate an answer to the query (block 850). For example, server device 220 may execute the selected TCE model(s), based on the information requested by the transformed search query, to generate an answer to the transformed search query. In some implementations, the selected TCE model(s) may generate different answers to the transformed search query, and server device 220 may select one of the different answers. For example, server device 220 may select an answer generated by a TCE model rated the highest by the developers associated with TCE-based search engine 225. In some implementations, server device 220 may calculate an average of the different answers, and may select the average as the answer to the transformed search query. In some implementations, server device 220 may provide a range of the different answers as the answer to the transformed search query. In some implementations, server device 220 may provide all of the different answers as the answer to the transformed search query.

As further shown in FIG. 8, process 800 may include providing for display the answer to the query (block 860). For example, server device 220 may provide the answer to user device 210, and user device 210 may provide the answer for display to the user. In some implementations, server device 220 may provide a TCE-based search engine user interface to user device 210, and user device 210 may provide the answer for display to the user via the TCE-based search engine user interface. In some implementations, server device 220 may store the answer in repository 230.

While FIG. 8 shows process 800 as including a particular quantity and arrangement of blocks, in some implementations, process 800 may include fewer blocks, additional blocks, or a different arrangement of blocks. Additionally, or alternatively, some of the blocks may be performed in parallel.

Figure 9C:
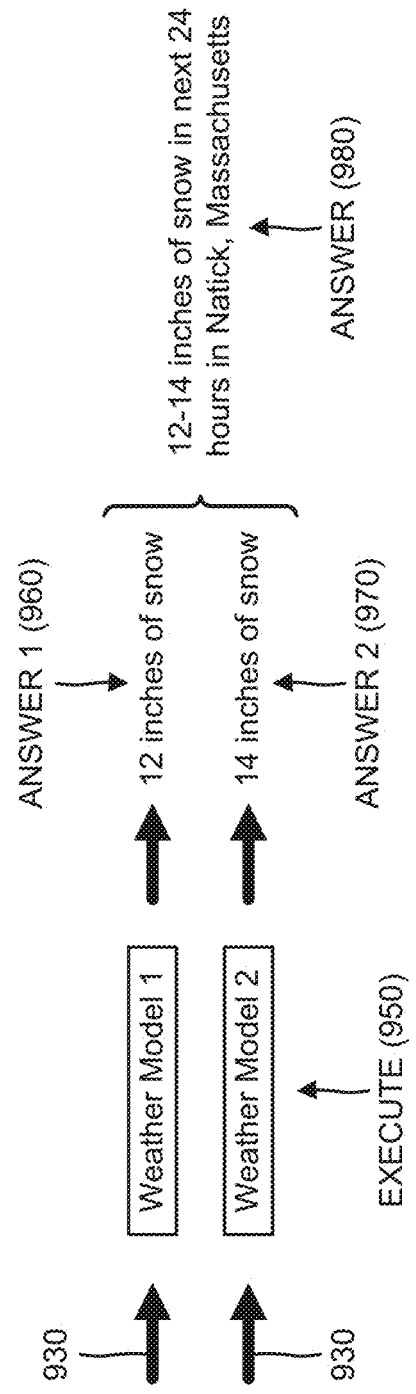

Example Generation of Results to a Search Query with the TCE-Based Search Engine FIGS. 9A-9D are diagrams of an example 900 of the process described in connection with FIG. 8. In example 900, assume that server device 220 generates a user interface associated with TCE-based search engine 225, and provides the user interface to user device 210. Further assume that user device 210 provides the user interface for display to a search query user, as shown in FIG. 9A. In some implementations, the user interface may include a field for inputting a search query. As further shown in FIG. 9A, further assume that the search query user provides a search query 910 (e.g., "How much snow will we get?") to user device 210 via the user interface (e.g., via the field for inputting a search query). User device 210 may provide search query 910 to server device 220, and server device 220 may receive search query 910.

Server device 220 may transform search query 910, as describe above in connection with FIGS. 6-7D, to generate a transformed search query 920. Transformed search query 920 may include the features of the transformed search query described above in connection with FIGS. 6-7D. As further shown in FIG. 9A, server device 220 may provide transformed search query 920 to TCE-based search engine 225, and TCE-based search engine 225 may receive transformed search query 920.

In example 900, assume that server device 220 (e.g., TCE-based search engine 225) determines information 930 requested by transformed search query 920 based on inputs of transformed search query 920, as shown in FIG. 9B. For example, as further shown in FIG. 9B, server device 220 may determine that transformed search query 920 includes information 930, such as a model type input (e.g., a weather model), a weather type input (e.g., snow), a quantity input (e.g., inches), a location input (e.g., Natick, Mass.), and a time input (e.g., 24 hours). Based on these inputs, server device 220 may determine that a snow prediction for Natick, Mass., in the next day, is requested by transformed search query 920.

As shown in FIG. 9B, server device 220 (e.g., TCE-based search engine 225) may utilize information 930 requested by transformed search query 920 to select one or more TCE models from repository 230. For example, server device 220 may compare requested information 930 to model information stored in repository 230, and may select TCE model(s) with information that matches requested information 930. As further shown in FIG. 9B, server device 220 may select a first weather model (Weather Model 1) and a second weather model (Weather Model 2) from repository 230, as indicated by reference number 940.

As shown in FIG. 9C, server device 220 (e.g., TCE-based search engine 225) may provide information 930 requested by transformed search query 920 to selected TCE models 940 (e.g., Weather Model 1 and Weather Model 2). For example, server device 220 may provide the inputs of transformed search query 920 (e.g., the weather type input, the quantity input, the location input, and the time input) to selected TCE models 940. Selected TCE models 940 may receive requested information 930 (e.g., inputs of transformed search query 920). As further shown in FIG. 9C, server device 220 may execute selected TCE models 940 based on requested information 930, as indicated by reference number 950. Execution of selected TCE models 940, may cause selected TCE models 940 to generate answers to transformed search query 920.

As shown in FIG. 9C, the first weather model may generate a first answer (ANSWER 1) 960 and the second weather model may generate a second answer (ANSWER 2) 970. First answer 960 may indicate that "12 inches of snow" is predicted for Natick, Mass. in the next 24 hours, and second answer 970 may indicate that "14 inches of snow" is predicted for Natick, Mass. in the next 24 hours. Since first answer 960 and second answer 970 are different, server device 220 may generate an answer 980 based on a range of first answer 960 and second answer 970. As further shown in FIG. 9C, answer 980 may indicate that there will be "12-14 inches of snow in next 24 hours in Natick, Mass."

Figure 9D:
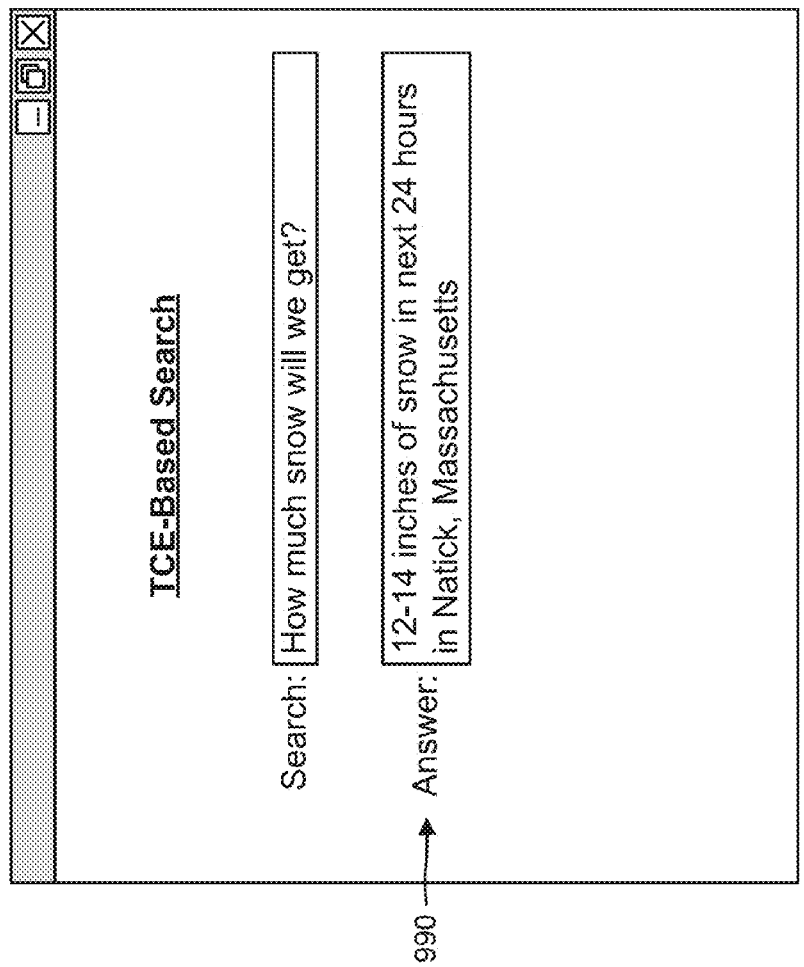

In example 900, assume that server device 220 provides answer 980 to user device 210, and user device 210 provides answer 980 for display to the user, as indicated by reference number 990 in FIG. 9D. In some implementations, server device 220 may provide a TCE-based search engine user interface (e.g., as shown in FIG. 9D) to user device 210, and user device 210 may provide answer 980 for display to the user via the TCE-based search engine user interface. In some implementations, server device 220 may store answer 980 in repository 230.

CONCLUSION

Systems and/or methods described herein may provide a TCE-based search engine that may provide an answer to a search query. The TCE-based search engine may be collaboratively created and improved by developers. The TCE-based search engine may provide an answer to a search query based on modeling, analysis, development, simulation, forecasting, and/or prediction of the search query in the TCE. The TCE-based search engine may be provided within a network (e.g., a social network, a professional network, etc.) that serves as an exchange for developers to share information and to provide information to the TCE-based search engine.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, a FPGA, a GPU, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving a search query,
      the receiving the search query being performed by a device;
   transforming the search query into a transformed search query understood by a technical computing environment (TCE)-based search engine,
      the transformed search query including a plurality of query elements, and
      the transforming the search query being performed by the device;
   determining, based on processing the plurality of query elements, information requested by the transformed search query,
      the information requested by the transformed search query being based on a determined intent associated with the search query, and
      the determining the information being performed by the device;
   determining a respective input type for each query element of the plurality of query elements,
      each respective input type corresponding to a respective TCE model of one or more TCE models, and
      the determining the respective input type being performed by the device;
   selecting at least one TCE model, of the one or more TCE models, from a repository based on the information requested by the transformed search query and based on the determined respective input type,
      the selecting the at least one TCE model being performed by the device;
   providing the information requested by the transformed search query to the selected at least one TCE model,
      the providing the information being performed by the device;
   executing the selected at least one TCE model, based on the information requested by the transformed search query, to generate an answer to the search query,
      the executing the selected at least one TCE model being performed by the device; and
   providing the answer for display,
      the providing the answer for display being performed by the device.

2. The method of claim 1, further comprising:
   storing the answer in the repository.

3. The method of claim 1, further comprising:
   selecting one or more TCE tools from the repository based on the information requested by the transformed search query;
   providing the information requested by the transformed search query to the selected one or more TCE tools; and
   executing the selected one or more TCE tools, based on the information requested by the transformed search query, to generate another answer to the search query.

4. The method of claim 1, where the transformed search query includes at least one of:
   model input data,
   a model configuration parameter,
   a model configuration setting,
   tool data,
   a tool configuration parameter, or
   personal information about a user who provided the search query.

5. The method of claim 1, where the search query includes one or more sequences of characters that request the answer.

6. The method of claim 1, where the answer includes a combination of multiple answers generated by the execution of the selected at least one TCE model of the one or more TCE models.

7. The method of claim 1, where the information requested by the transformed search query includes one or more inputs to the selected at least one TCE model of the one or more TCE models.

8. A non-transitory computer-readable medium for storing instructions, the instructions comprising:
   one or more instructions that, when executed by a processor of a device, cause the processor to:
      receive a search query;
      transform the search query into a transformed search query understood by a technical computing environment (TCE)-based search engine,
         the transformed search query including a plurality of query elements;
      determine, based on processing the plurality of query elements, information requested by the transformed search query,
         the information requested by the transformed search query being based on a determined intent associated with the search query;
      determine a respective input type for each query element of the plurality of query elements,
         each respective input type corresponding to a respective TCE model of one or more TCE models;
      select at least one TCE model, of the one or more TCE models, from a repository based on the information requested by the transformed search query and based on the determined respective input type;
      provide the information requested by the transformed search query to the selected at least one TCE model;
      execute the selected at least one TCE model, based on the information requested by the transformed search query, to generate an answer to the search query; and
      provide the answer for display.

9. The non-transitory computer-readable medium of claim 8, where the instructions further comprise:
   one or more instructions that, when executed by the processor, cause the processor to:
      store the answer in the repository.

10. The non-transitory computer-readable medium of claim 8, where the transformed search query includes at least one of:
    model input data,
    a model configuration parameter,
    a model configuration setting,
    tool data,
    a tool configuration parameter, or
    personal information about a user who provided the search query.

11. The non-transitory computer-readable medium of claim 8, where the instructions further comprise:
    one or more instructions that, when executed by the processor, cause the processor to:
       select one or more TCE tools from the repository based on the information requested by the transformed search query;
       provide the information requested by the transformed search query to the selected one or more TCE tools; and
       execute the selected one or more TCE tools, based on the information requested by the transformed search query, to generate another answer to the search query.

12. The non-transitory computer-readable medium of claim 8, where the search query includes one or more sequences of characters that request the answer.

13. The non-transitory computer-readable medium of claim 8, where the answer includes a combination of multiple answers generated by the execution of the selected at least one TCE model of the one or more TCE models.

14. The non-transitory computer-readable medium of claim 8, where the information requested by the transformed search query includes one or more inputs to the selected at least one TCE model of the one or more TCE models.

15. A device comprising:
   one or more processors to:
      receive a search query;
      transform the search query into a transformed search query understood by a technical computing environment (TCE)-based search engine,
         the transformed search query including a plurality of query elements;
      determine, based on processing the plurality of query elements, information requested by the transformed search query,
         the information requested by the transformed search query being based on a determined intent associated with the search query;
      determine a respective input type for each query element of the plurality of query elements,
         each respective input type corresponding to a respective TCE model of one or more TCE models;
      select at least one TCE model, of the one or more TCE models, from a repository based on the information requested by the transformed search query and based on the determined respective input type;
      provide the information requested by the transformed search query to the selected at least one TCE model;
      execute the selected at least one TCE model, based on the information requested by the transformed search query, to generate an answer to the search query; and
      provide the answer for display.

16. The device of claim 15, where the one or more processors are further to:
   store the answer in the repository.

17. The device of claim 15, where the transformed search query includes at least one of:
   model input data,
   a model configuration parameter,
   a model configuration setting,
   tool data,
   a tool configuration parameter, or
   personal information about a user who provided the search query.

18. The device of claim 15, where the one or more processors are further to:
   select one or more TCE tools from the repository based on the information requested by the transformed search query;
   provide the information requested by the transformed search query to the selected one or more TCE tools; and
   execute the selected one or more TCE tools, based on the information requested by the transformed search query, to generate another answer to the search query.

19. The device of claim 15, where the search query includes one or more sequences of characters that request the answer.

20. The device of claim 15, where the answer includes a combination of multiple answers generated by the execution of the selected at least one TCE model of the one or more TCE models.

\* \* \* \* \*